US008256667B2

(12) United States Patent  
Poznansky et al.

(10) Patent No.: US 8,256,667 B2
(45) Date of Patent: Sep. 4, 2012

(54) TRANSACTION CARD WITH IMPROVED SECURITY FEATURES

(76) Inventors: Amir Poznansky, Tel Aviv (IL); Asher Yahalom, Givaat Shmuel (IL); Haim Cohen, Beit-Hashmonay (IL)

( * ) Notice: Subject to any disclaimer, the term of this patent is extended or adjusted under 35 U.S.C. 154(b) by 0 days.

(21) Appl. No.: 13/008,302

(22) Filed: Jan. 18, 2011

(65) Prior Publication Data

US 2011/0174874 A1 Jul. 21, 2011

(30) Foreign Application Priority Data

Jan. 19, 2010 (GB) .................................. 1000814.2

(51) Int. Cl.
*G06K 5/00* (2006.01)
(52) U.S. Cl. .......................... 235/380; 235/449; 235/493
(58) Field of Classification Search .................. 235/380, 235/449, 493
See application file for complete search history.

(56) References Cited

U.S. PATENT DOCUMENTS

| 4,614,861 | A | 9/1986 | Palov et al. |
|---|---|---|---|
| 5,623,552 | A | 4/1997 | Lane |
| 6,089,451 | A | 7/2000 | Krause |
| 6,199,762 | B1 * | 3/2001 | Hohle ........................... 235/492 |
| 6,549,149 | B2 * | 4/2003 | Aue ............................. 341/118 |
| 6,631,849 | B2 | 10/2003 | Blossom |
| 6,954,133 | B2 | 10/2005 | McGregor et al. |
| 7,191,952 | B2 | 3/2007 | Blossom |
| 7,270,276 | B2 | 9/2007 | Vayssiere |
| 7,328,850 | B2 | 2/2008 | Sines |
| 7,347,382 | B2 | 3/2008 | Ferber et al. |

| 2002/0043566 | A1 | 4/2002 | Goodman et al. |
|---|---|---|---|
| 2007/0136211 | A1 * | 6/2007 | Brown et al. .................... 705/75 |
| 2007/0152052 | A1 * | 7/2007 | Sines ............................. 235/449 |
| 2007/0189581 | A1 | 8/2007 | Nordentoft et al. |
| 2008/0006706 | A1 * | 1/2008 | Jorna et al. ..................... 235/494 |

(Continued)

FOREIGN PATENT DOCUMENTS

WO 0152204 A1 7/2001

(Continued)

OTHER PUBLICATIONS

Delooze, P. et al; "AC biased sub-nano-tesla magnetic field sensor for low-frequency applications utilizing magnetoimpedance in multilayer films" IEEE Transactions on Magnetics, vol. 41, No. 10, (2005), pp. 3652-3654.

(Continued)

*Primary Examiner* — Kristy A Haupt
(74) *Attorney, Agent, or Firm* — The Law Office of Michael E. Kondoudis

(57) ABSTRACT

A transaction card with improved security features, comprising: an authentication unit and a magnetic stripe wherein parts of the magnetic field pattern of said magnetic stripe are generated by currents running through coils only after the authentication unit authenticates the transaction card holder. One or more sensors detect attempts to read the card by two magnetic heads, and block the card if a cloning attempt is suspected. The transaction card is thus closed for transactions in a normal state, and the magnetic information is not readable. Only after the card holder authentication, then currents are run through the coils to generate the magnetic information and make the magnetic stripe readable by commercial devices. Authentication means may include entering a PIN via a keyboard, entering a PIN via a keypad, voice recognition identification of one or more voices, biometric identification, or identification via a connection to a remote device.

21 Claims, 19 Drawing Sheets

U.S. PATENT DOCUMENTS

| | | |
|---|---|---|
| 2008/0126260 A1 | 5/2008 | Cox et al. |
| 2010/0155470 A1 * | 6/2010 | Woronec ................ 235/380 |

FOREIGN PATENT DOCUMENTS

| | | |
|---|---|---|
| WO | 2006020858 A2 | 2/2006 |
| WO | 2008067160 A2 | 6/2008 |
| WO | 2009082760 A2 | 7/2009 |
| WO | 2009148980 A2 | 12/2009 |

OTHER PUBLICATIONS

Fung, C.K.M et al "Fabrication of CNT-based MEMS piezoresistive pressure sensors using DEP nanoassembly" Proceedings of 2005 5th IEEE Conference on Nanotechnology Nagoya, Japan, (2005), pp. 199-202.

* cited by examiner emulation coils 113,114

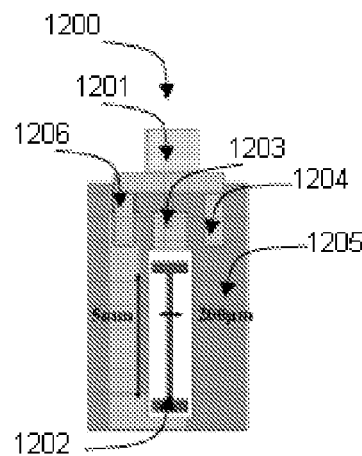
Fig. 12 - TESLA
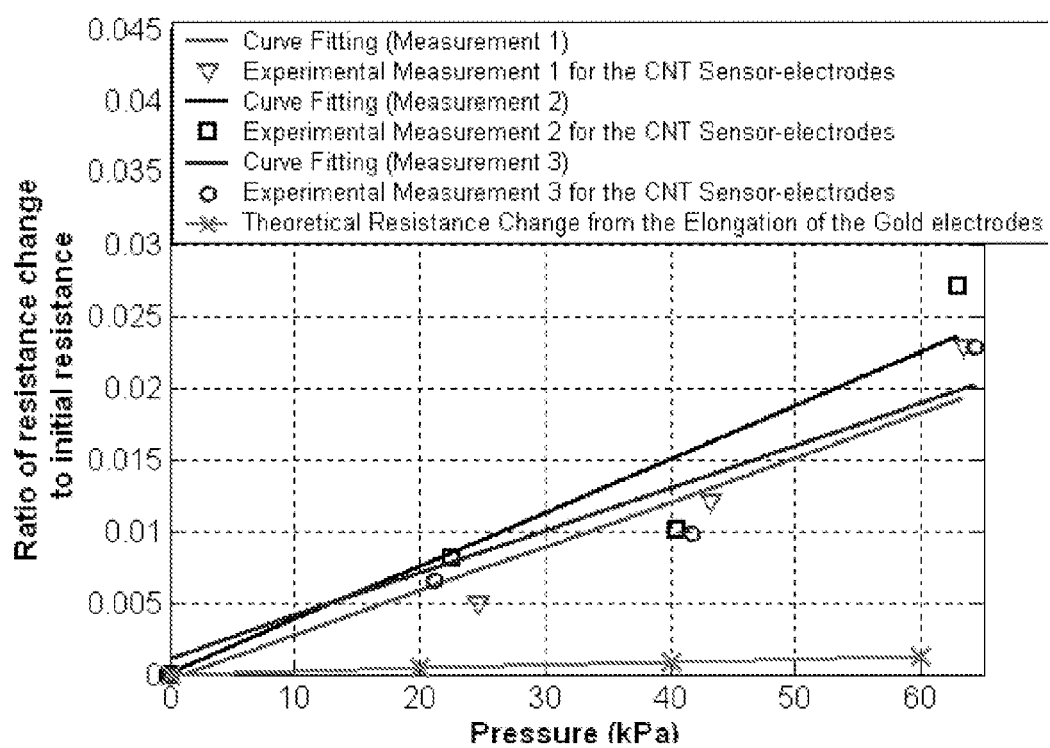
Fig. 13 partial pieces of the magnetic stripe

Logical flowchart operation

TRANSACTION CARD WITH IMPROVED SECURITY FEATURES

CROSS REFERENCE TO OTHER APPLICATIONS

The present invention claims priority from Great Britain Patent Application No. GB1000814.2 filed on Jan. 19, 2010 and incorporated herein by reference.

TECHNICAL FIELD

The present invention relates to transaction cards in general and in particular to transaction cards with improved security features such as a magnetic stripe emulator and cloning detection means.

BACKGROUND ART

Transaction cards, and in particular commercial credit cards, have been in use in commerce for over 50 years. Transactions cards are a very popular mean in order to identify a person or an account holder. Transaction cards are used for a variety of applications from financial transactions and registering presence to library cards. Financial transactions in the form of credit cards are probably one of the most popular uses of transactions cards today. These financial transactions include debit and credit card (which will be both referenced herein as "credit cards"), which are typically used for retail purchases, online purchases and cash retrieval at Automatic Teller Machines (ATM's).

Financial transactions via credit cards are very popular since they offer several advantages for both users and merchants. Users do not need to carry large amounts of cash on them in order to purchase goods or services. In addition, some cards offer the user, the possibility of deferring some or all of the payments for the goods or services purchased thus offering accessible (though not always cheap) credit services.

Credit cards offer several advantages to merchants, for example, not holding or accumulating large amounts of cash in the business (cash that can be lost, stolen, robbed and that needs secured delivery for deposit), guarantee of payments by the card issuer as opposed to personal checks that may not be approved or honored. In addition, credit cards are an excellent tool to accept payment remotely from a user either on the Internet, via fax, mail or over the telephone.

As credit cards become such a popular tool for payment, fighting credit card fraud has become a major issue for financial institutions and merchants. Credit card fraud can be categorized into two main types of fraud: one where a genuine card is stolen or lost and arrives to the hands of an unauthorized user; the other type being when the information regarding a credit card arrives to an unauthorized user which uses this data to purchases goods or services online or alternatively manages to create a duplicate credit card which is then used in retail and/or for cash retrieval.

Credit card identification and authentication is achieved in retail in one of three ways:

1. Retail offline transaction (embossment)—the oldest way for reading credit cards is to "iron" the card over a credit card slip that uses a technology such as carbon paper in order to mark the credit card number present on the credit card as an embossment into the slip. The merchant then writes by hand the amount, transaction type and date, and the user authenticates the transaction by a signature. The merchant does not know if the credit card is valid. The merchant can validate whether the signature is substantially identical to the signature on the card and can authenticate the user name on the credit card with a picture identification that the user presents. Most importantly, the merchant does not receive any confirmation from the credit card company that the transaction is authorized, unless the merchant calls the credit company giving them all the details over the telephone.

2. Retail connected transaction (magnetic stripe)—most businesses today have a system that reads the card details present in the magnetic stripe of the card. The card details together with the requested transaction are then communicated to the clearing center (via a telephone line, data line or similar communication methods) which authorizes or denies the transaction. Once a transaction is authorized, the user signs the transaction slip and the merchant is guaranteed to receive payment by the card issuer for the goods or services provided.

3. Retail connected transaction with additional user identification using a Personal Identification Number (PIN code)—more and more credit cards now also include a microprocessor and dedicated memory (aka "Smart Cards"). The user is supplied with a PIN code that needs to be entered on location in order to confirm a transaction. Only after the PIN code is correctly entered, the card and transaction details are communicated to the clearing center to receive authorization for the transaction.

It is important to notice that today (2009) commercial credit cards issuers such as Visa™ and MasterCard™ still accept transactions via magnetic stripe reading and also number reading via embossment, since a credit card needs to be available for purchase worldwide. A Smart Card holder may travel to a remote location where the merchant may only have an embossment reader, so all Smart Cards today also include an embossment of the number for backwards compatibility.

Credit cards arrive to fraudulent hands via several ways: a genuine card may be stolen or lost, or the data of a credit card may be fraudulently obtained and used to create a duplicate credit card. In the first scenario of a lost or stolen credit card the owner informs the card issuer who then proceeds to block transactions with the card. In the case of a duplicate card, the card owner will only alert the card issuer after he notices purchases that have been made and that he recognizes as not being made by him.

A stolen or lost Smart Card cannot be used in retail since the fraudulent user does not know the PIN code necessary for confirming purchases or retrieving cash from an ATM. A stolen or lost Smart Card can nevertheless be used with retailers who only support magnetic stripe reading or number embossment reading transactions.

More and more credit card transactions are performed nowadays remotely either over the Internet, telephone, fax or mail. These types of transactions are known as "card not present (CNP) transaction" wherein the merchant does not physically see the actual credit card being charged. The PIN code of the Smart Card is not used or requested in these remote transactions.

In order to improve the security of in-person and remote transactions two additional 3 or 4 digit numbers are typically printed on the back a credit card. The first code is known as Card Verification Code 1 (CVC1) or Card Verification Value 1 (CVV1) and is intended for transactions in person and is encoded on the magnetic stripe. In contrary, the second security code known as Card Security Code (CSC) is not encoded on the magnetic stripe and is used for remote transactions such as over the telephone, Internet, by mail or by fax. The CSC is also known as Card Verification Value (CVV or CV2), Card Verification Value Code (CVVC), Card Verification Code (CVC), Verification Code (V-Code or V Code), or Card Code Verification (CCV). Supplying the CSC code in a transaction is intended to verify that the customer has the card in their possession. Knowledge of the code proves that the customer has seen the card, or has seen a record made by somebody who saw the card.

There is thus an ongoing need, with great financial implications, to provide credit cards that include improved security features for both retail and remote transactions.

SUMMARY OF INVENTION

It is an object of the present invention to present a transaction card enabling partial emulation of the card's magnetic stripe.

It is another object of the present invention to present a transaction card wherein the card's magnetic stripe cannot be read until the card holder authenticates himself.

It is a further object of the present invention to present a transaction card comprising at least one sensor that can detect card cloning attempts.

It is yet another object of the present invention to present a transaction card comprising at least one sensor that can detect when two reading magnetic heads attempt to read the transaction card at the same time.

It is yet a further object of the present invention to present a transaction card that can disable essential features of the transaction card when a cloning attempt is detected.

It is yet another object of the present invention to present a transaction card that can disable the transaction card's magnetic head and/or disconnect the card's communication connectors when a cloning attempt is detected.

Amperes law dictates that an electric current can change a magnetic field. The present invention makes use of the phenomenon discovered by Ampere, in which a magnetic material causing a certain magnetic field is emulated by a current which has a certain shape and strength such as to create the same magnetic field as the magnetic material it replaces. The current flows through a wire due to the potential difference generated by a battery, and is switched on and off using a Central Processing Unit (CPU).

The present invention thus relates to the protection of transaction cards in general and in particular to the protection of credit cards for retail purchases. The transaction card of the invention offers several levels of protection to make the transaction card more secure to own and use.

The present invention further relates to a transaction card, comprising:
(i) an authentication unit for authenticating the transaction card holder;
(ii) a magnetic stripe wherein parts of the magnetic field pattern of the magnetic stripe are generated by currents running through pickup coils only after said authentication unit authenticates the transaction card holder; and
(iii) one or more sensors located along the magnetic stripe in order to detect if the transaction card is being read by two reading magnetic heads at the same time, wherein the transaction card is blocked by stopping the currents from running through the pickup coils when a second reading magnetic head is detected.

Credit cards of the art are equipped with a magnetic stripe with encoded information. If such credit card is lost or stolen, the fraudulent user can present the credit card for a fraudulent transaction, and the information of the magnetic card will be read normally. The transaction card of the invention comprises a magnetic stripe that by default is not readable, since part of the magnetic information is not available. Only when the legitimate owner of the transaction card authenticates himself, then a processor chip emulates the missing magnetic information, thus making the magnetic stripe of the transaction card readable by available magnetic stripe readers.

The authentication of the transaction card can be made in one or more ways, for example, entering PIN code via a keyboard on the card, voice recognition authentication, biometric authentication, any other authentication process, or any combination thereof. Alternatively, if the transaction card has communication capabilities, for example, radio frequency (RF) then the authentication can be done via a remote device such as a mobile phone in communication with the transaction card.

Another security feature offered by the transaction card of the invention is that in the case of smart cards, the communication means defined by International Organization for Standardization (ISO) 7816 can also be blocked by default, and only be available after the authentication process.

Once the legitimate card owner authenticates himself, the transaction card is made available for commercial transactions via the readable magnetic stripe or communicating smart card chip for a defined legitimate time. The defined legitimate time can be defined for one or more commercial transactions and/or for a limiting period of time. For example, after authentication the card can be defined as available for a single commercial transaction in the next 3 minutes; or for a single commercial transaction without any time limit; or for unlimited transactions in the next two minutes etc. These legitimate usage definitions and limits are typically defined by the transaction card issuer, though in principle they could also technically be set by the card owner.

A further security feature offered by the transaction card of the invention comprises one or more intrusion sensors that alert the card's processor that the magnetic stripe is being read by two reading magnetic heads, signaling that one reading magnetic head is most likely an unauthorized reader. The processor then proceeds to block the card (magnetic stripe and/or ISO 7816 communication connectors), and attempts to alert the user and/or the card issuer. The one or more intrusion sensors can be pressure sensors or magnetic sensors or both.

In some embodiments, the one or more sensors for detecting card cloning are one or more Micro Electro Mechanical System (MEMS) pressure nanosensors that detect the pressure pulse induced by a reading magnetic head, wherein if the pressure nanosensors detect two pressure pulses corresponding to two reading magnetic heads while the magnetic stripe is being read then the one of the reading magnetic heads is assumed to be a fraudulent reading magnetic.

The transaction card of the invention can be equipped with communication capabilities such as Near Field Communication (NFC) by Radio Frequency Identification (RFID) in order to communicate with nearby devices such as credit card readers, ATM machines and mobile phones. Preferably, the card will provide a secured communication interface. A credit card of the art is always opened for communication, a feature that can be maliciously exploited, for example, by installing a fraudulent "fake" ATM machine or façade that reads credit card information to be transferred to unauthorized hands. The transaction card of the invention can require any reading device to authenticate itself (via a predefined authentication protocol) wirelessly, before the transaction card makes itself available for reading via the magnetic stripe and/or ISO 7816 communication connectors.

The transaction card owner's mobile phone can be used for input and authentication, as well as for remote operation. For example, the transaction card can verify the presence of the owner's mobile phone using NFC before the card is opened for communication. Alternatively, the mobile phone can be used to input a PIN code that is then transmitted to the transaction card in order to authenticate the user and to enable a transaction by remote connection to an ATM machine as well as to a credit card processing machine at the clearing service unit. The remote connection transmits information such as the card owner's ID, the card IP and the transaction face amount.

BRIEF DESCRIPTION OF DRAWINGS

FIG. 2A shows the front side of a credit card comprising a 7816 connector. FIGS. 2B-2C show the back side of the credit card comprising an LCD screen, two statuses LED's, an OK button and a numeric keypad with dynamic keys. FIG. 2B shows one position of the keypad, while FIG. 2C shows another position of the keypad.

FIG. 12 shows an illustration of the sub-nano Tesla magnetic field sensor structure.

FIG. 13 is a graph of the Resistance-pressure dependency of a typical MWNT pressure nanosensor for 3 different measurements. The graph shows the resistance-pressure dependency of a typical MWNT (Multi walled nano tube) pressure sensor for 3 different measurements. The solid line with the cross marker is the theoretical expectation of the resistance contribution from gold electrodes.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to the protection of transaction cards such as credit cards, personal identification cards, driving licenses etc. For clarity purposes, the term "credit card" or "card" as used herein should be interpreted to include any type of transaction card that is based on data stored on a magnetic stripe, in a smart chip (processor and memory) or a card comprising both magnetic stripe and processor with memory.

Figure 1:
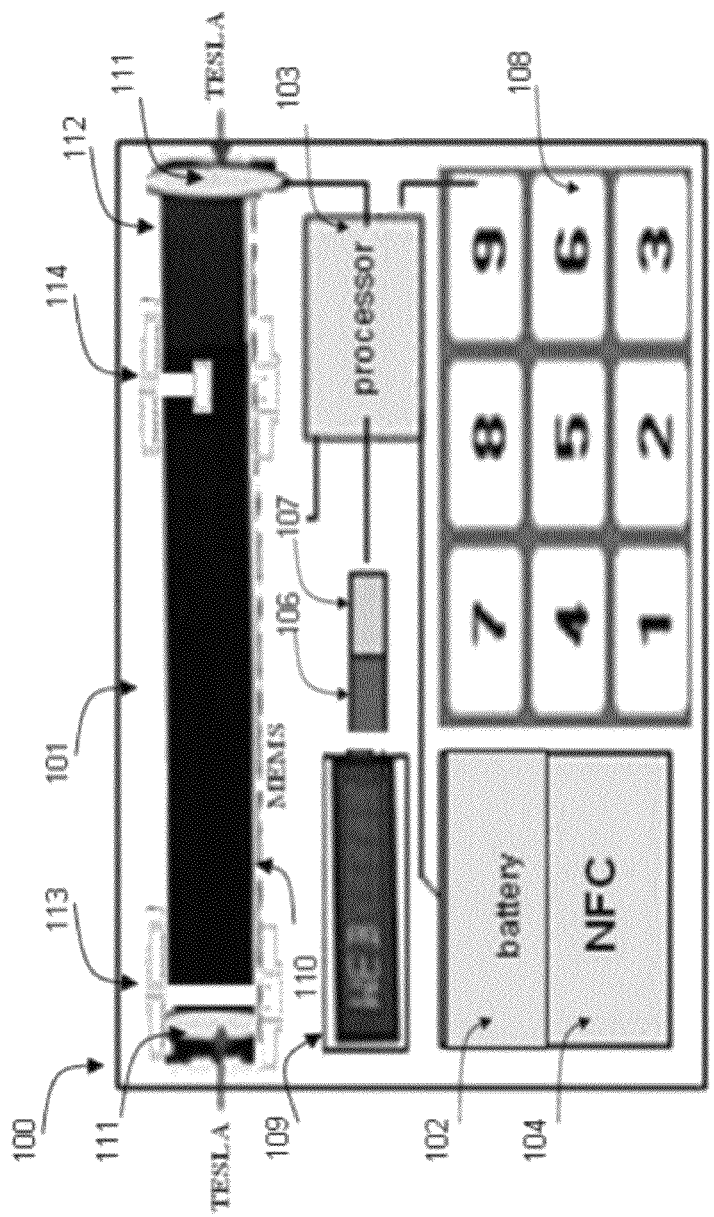
FIG. 1 is an illustration of an embodiment of a transaction card of the present invention comprising a power source, a microprocessor chip, with a self Erasable Programmable Read Only Memory (EPROM), NFC communication chip, two status Light Emitting Diode (LED), a Liquid Crystal Display (LCD), as well as two intrusion sensors.

Reference is now made to FIG. 1 illustrating an embodiment of a transaction card 100 of the present invention; the card is formed from a laminar plastic 101, having dimensions as specified in the ISO/TC97/SC17/WG4-N95. The card 100 comprises an independent power source 102 such as one based on LECLANCHE, "leaf battery", a microprocessor chip 103 typically containing a self EPROM memory, a Near Field Communication (NFC) communication chip 104, two Light Emitting Diodes (LED) red 106 and green 107, a numeric keypad 108, a 7 segment LCD 109, as well as two intrusion sensors, based on Micro Electro Mechanical System (MEMS) pressure sensor 110 and TESLA magnetic sensor 111. The two LED's, for example, green 107 and red 106 indicate the transaction card's state: green 107 for approval mode (open to perform a transaction) and red 106 for blocked (card cannot perform any transaction). The 7 segment LCD 109 serves for displaying the typed authentication key (PIN) by the user, though it is possible also not to have an LCD 109 on the card and indicated the success or failure of the authentication simply by the color of the LED's 106,107.

The magnetic stripe 112 of the transaction card 100 of the invention is by default not readable because unlike a standard magnetic card in which a magnetic field pattern is created by the permanent magnetization of the magnetic stripe 112, in the current invention part of magnetic field pattern is created by currents running through coils 113, 114.

The first coil 113 can be assembled, for example, at the beginning of the magnetic stripe 112, at the first edge towards the ATM/payment machine direction according to the card movement, in order to block the mechanical input of the card into the BANK machine/ATM when the card 100 is not open for operation. The second coil 114 can be located at the track2 pin code position so that the pin code can be read only after the card holder has authenticated himself and the card 100 is open for transactions. The implementation of assembling the emulation's coils 113,114 in the plastic laminar 101 card, between the data's ferrite magnetic bits, enables to open and close the magnetic stripe 112 sequentially. It should be understood though, that the two emulation coils 113,114 can be placed at any location along the magnetic stripe.

Figure 10:
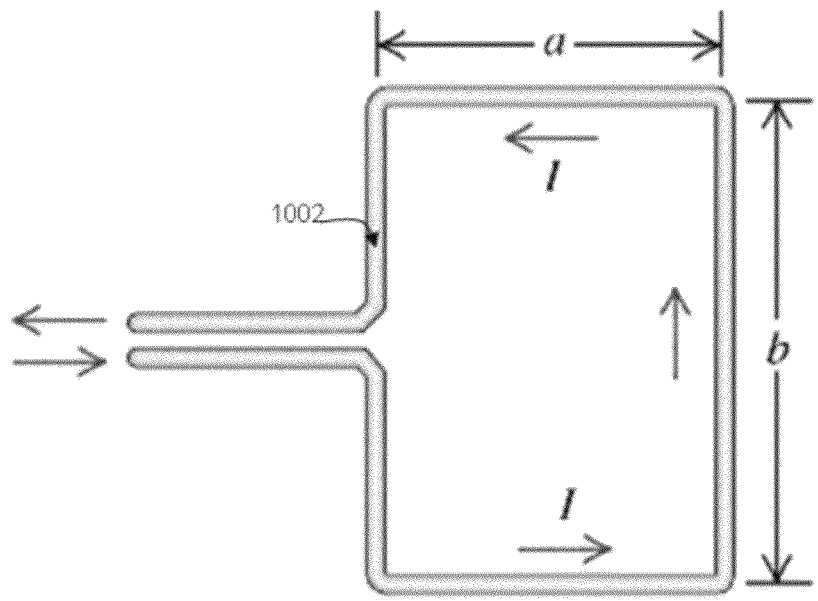
FIG. 10 shows the magnetic coil which serves to emulate the magnetic bit, some of the dimensions of the coil are designated along with the direction of electric current flowing through the coil.

According to Ampere's law, a current will generate a magnetic field and one can show mathematically that creating a solenoid 113,114 with dimensions which are the same as the magnetic bit and with a proper current will result in exactly the same magnetic field as produced by the bit. There is an important difference, however, an active magnetic bit can be shut down thus preventing the magnetic reader from reading the data on the stripe 112 correctly, thus disabling the card's 100 functionality. Only after the user authenticates himself to the authentication unit through the defined authentication process, then the processor 103 of the card 100 sends a command to the coils 113, 114 (shown in FIG. 10) to emulate the missing information of the magnetic stripe 112, thus rendering the magnetic stripe 112 readable by a reading magnetic head.

The authentication unit encompasses input means for the user to authenticate himself (such as a numeric keypad 108, or any biometric input means, for example, for reading fingerprints, voice prints etc.); feedback means (an LCD 109 screen, two LEDs, red 106 and green 107); and the authentication algorithm processor 103 with its attached memory.

Figure 2A:
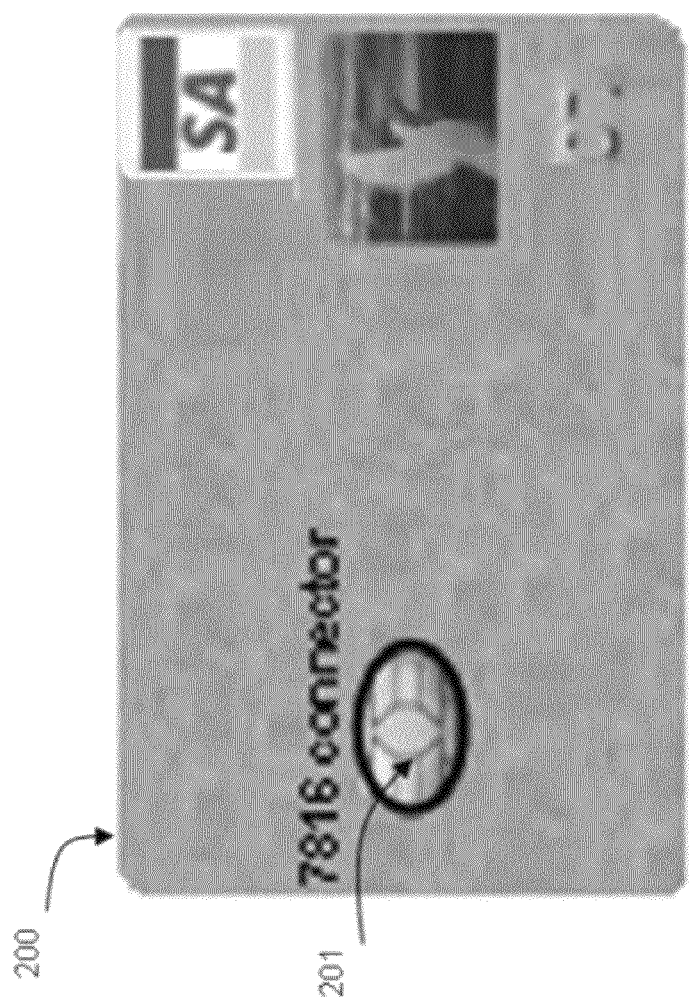
FIGS. 2A-2C shows an embodiment of a credit card according to the invention.
Figure 2B:
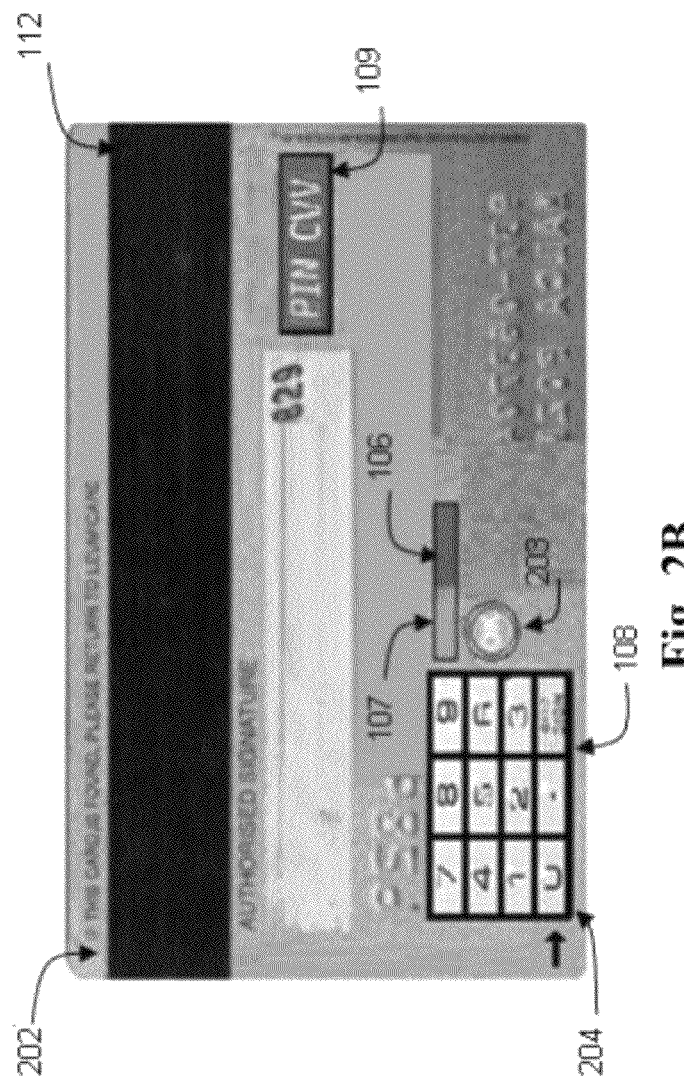
Figure 2C:
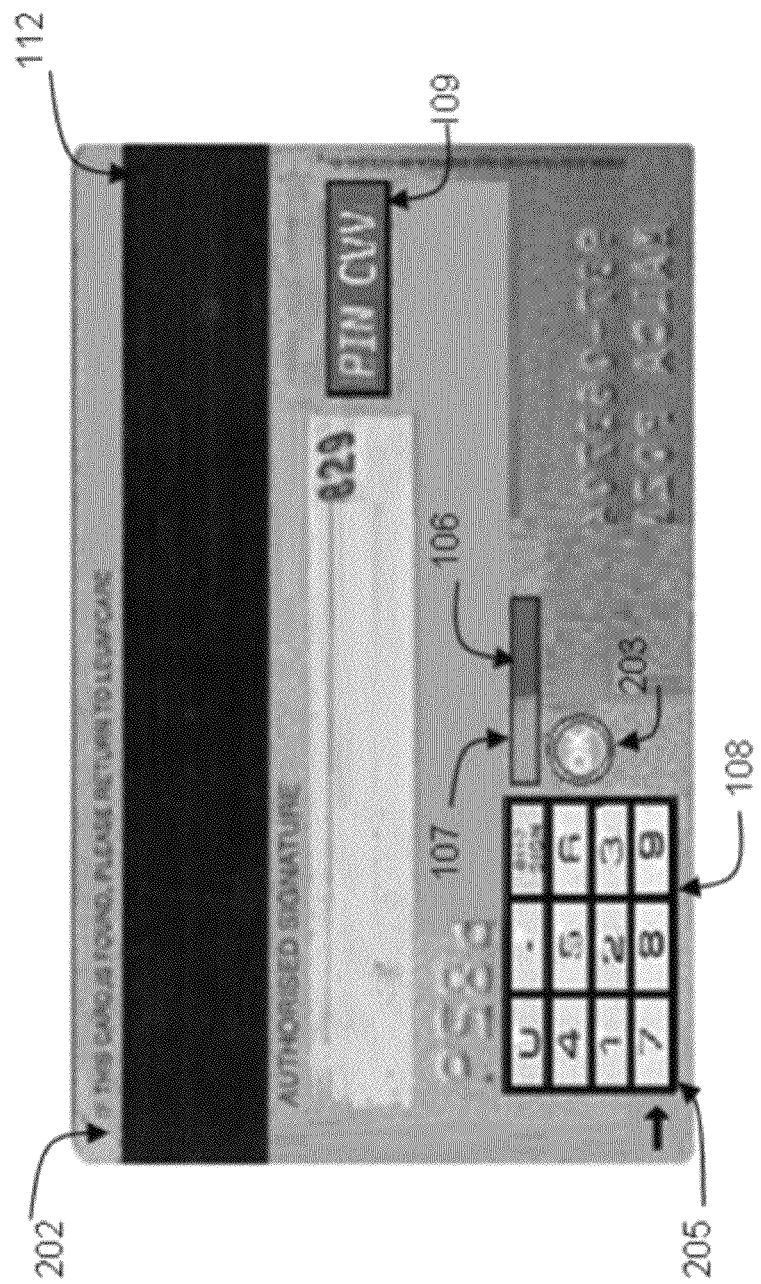

Reference is now made to FIGS. 2A-2C showing an embodiment of a credit card 100 according to the invention. FIG. 2A shows the front side 200 of a credit card 100 comprising the ISO 7816 connectors 201 that serve for communicating with the processor 103 of a smart card. FIGS. 2B-2C show the back side 202 of the credit card 100 comprising an LCD screen 109, two status LED's 106, 107, an OK button 203 and a numeric keypad 108 with dynamic keys.

Normally, since the card holder (user) types the same PIN code each time he wishes to perform a transaction, the corresponding PIN's keys on the numeric keypad 108 will wear out more rapidly than the other keys and may thus be distinguishable. In this case, if somebody gets hold of the card 100 fraudulently, and is able to identify the 4 digits of the PIN code by visual inspection of worn out key pads, then cracking a 4 digits PIN code when the digits (but not the order) are known will involve trying less than 4*4*4*4=256 possibilities as opposed to trying 6,561 different possibilities (9*9*9*9) for a 4 digit code and 9 different possibilities for each PIN digit.

In order to solve the identification of the PIN's digits by inspecting the wear out of the keypad's 108 keys, the dynamic keypad 108 is based on LCD touch pads, thus for each key entry the keypad's digits are shifted randomly around and shown in a new position. Thus using the dynamic keypad 108, a visual inspection of the keypad will be meaningless as the position of each number is random. In addition, if someone observes from a distance the card owner keying in the PIN code, the position on which the user pressed the keys is meaningless since the same number will show up at a different locations of the keypad 108 the first time 204, and the second time 205. In FIG. 2B one can see that the keypad 108 is arranged normally 204, while in FIG. 2C the three lower rows have changed places 205 compared to their location 204 in FIG. 2B. It is also possible to move individual keys around (not shown) and thus form each row from different keys each time.

The green LED 107 switches on in order to signal that the PIN code has been entered correctly and that the transaction card 100 is open to perform a transaction. The red LED 106 switches on in case a fraudulent usage is detected or in case of an incorrect PIN code entry. The LCD display 109 shows the typed PIN code entered for the user's convenience.

Another security feature consists of disabling by default the ISO 7816 connectors 201 that serve for communicating with the processor 103 of a smart card 100. The disabling is achieved by using the Mosfet gate (shown on FIG. 7) to enable and disable the power connector of the 7816 connector. Again, these connectors are enabled only after a successful user authentication process to the authentication unit.

The enablement of the magnetic stripe 112 and the enabling of the 7816 connectors 201 is a temporary enablement limited either by time or by transactions. For example, card 100 enablement for a given amount of time, or card 100 enablement for one or X transactions). The enablement can be limited by both time and the number of transactions, for example, card 100 enabled for one transaction to be made in the next 3 minutes, or unlimited transactions in the next 10 minutes.

The authentication process to the authentication unit can be achieved by one or more procedures. For example, the transaction card 100 can be equipped with a keypad 108 and optionally a display screen 109. Before the card owner wishes to effect a transaction, the card owner needs to enter a PIN code on the keypad 108.

When the user touches the keypad 108, then the keypad 108 is activated and the processor 103 validates the typed PIN code. Validation of the typed PIN code can be achieved in several ways. For example, the PIN code can be compared with the real code that was burnt in the card's Read Only Memory (ROM) 103.

Figure 3A:
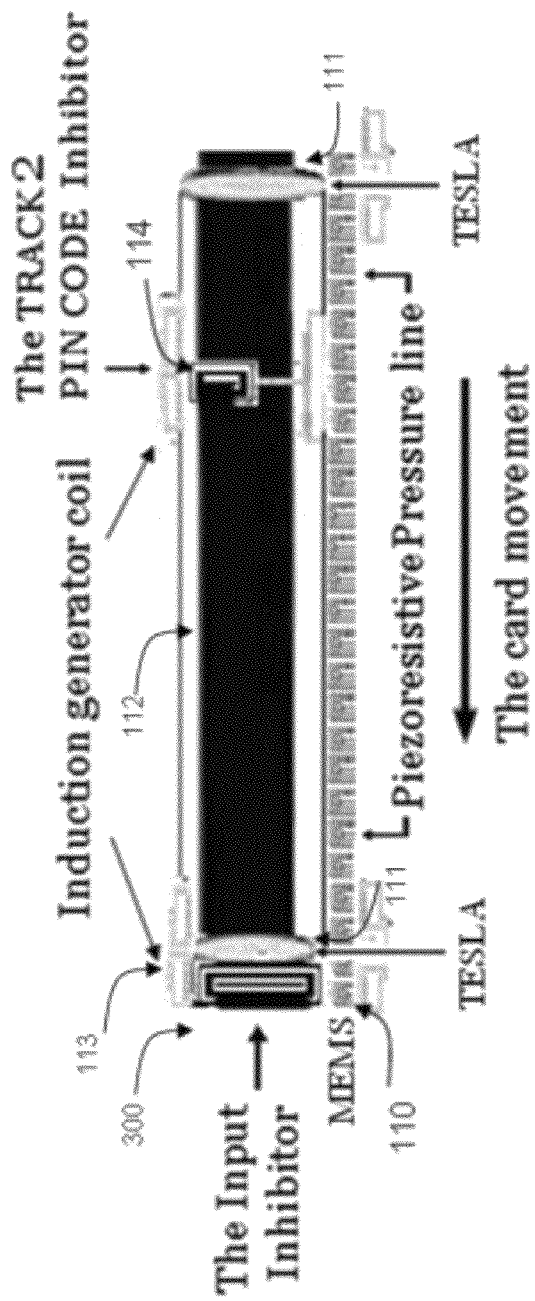
FIG. 3A illustrates an embodiment of the structure of a partially emulated magnetic stripe according to the invention, comprising two induction generating coils which replace and emulate a portion of the magnetic stripe ferrites. The coils only generate a magnetic field when a current flows through the coils. Without current, the coils do not generate a magnetic field thus making the magnetic stripe incomplete and thus unreadable.

Reference is now made to FIG. 3A illustrating an embodiment of the structure 300 of a partially emulated magnetic stripe 112 according to the invention. The structure 300 comprises two induction generating coils 113,114 (also known as pickup coils) which replace and emulate a portion of the magnetic stripe 112 ferrites. The coils 113,114 only generate a magnetic field when a current is flowed through the coils 113,114. Without current, the coils 113, 114 do not generate a magnetic field thus rendering the magnetic stripe 112 unreadable. The term "unreadable" or "close" in reference with the magnetic stripe 112 refers to a situation where not all the information on the magnetic card is available, and thus a transaction, such as a financial transaction, cannot be completed successfully.

The first coil 113 can be assembled at the beginning of the magnetic stripe 112 (as shown in FIG. 3A) at the side of the card 110 that enters the ATM or payment machine. Many ATM machines will prevent the mechanical input of a credit card 110 unless the beginning of the magnetic stripe 112 is read correctly. Thus with the credit card 100 of the invention, unless the card holder authenticates himself to the authentication unit and opens the card for transactions, the magnetic stripe 112 will not be successfully readable by the ATM machine thus preventing the credit card 100 to be entered into the ATM machine.

Figure 4:
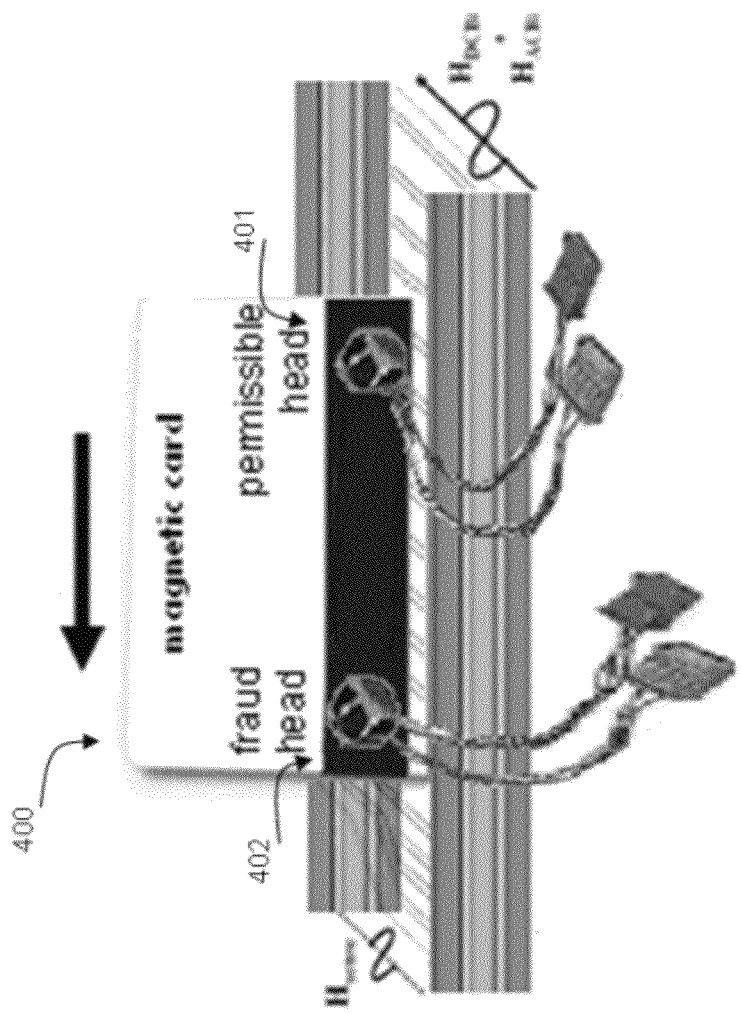
FIG. 4 illustrates the two magnetic fields that are created when two reading magnetic readers are present.

The second coil 114 (as shown in FIG. 3A) can be located at the track2 301 pin code position, in order to block the PIN code data's ferrites from being read unless the card 110 is open for transactions. The magnetic sensor 111 (such as Tesla) and the Piezoresistive Pressure (MEMS) sensor 110 line can detect a card 100 cloning attempt in case two reading magnetic heads 400 as shown in FIG. 4 attempt to read the magnetic stripe 112 simultaneously, shown in FIG. 4 as a fraudulent reading magnetic head 402 and the legitimate reading magnetic head 401. The implementation of assembling the emulation's coils 113,114 in the plastic laminar card 101, between the data's ferrite magnetic bits, enables to open and close the magnetic stripe 112 so that the magnetic stripe 112 is continuous when open and broken when close. The Piezoresistive Pressure sensor 110 under the magnetic stripe 112 detects the pressure's mechanic division in case of two reading magnetic heads 401, 402 attempt to read the magnetic stripe 112 at the same time. The current that is created by the mechanic pressure of the magnetic head 401 can be used to charge the battery 102 in the PSU 705.

Figure 3B:
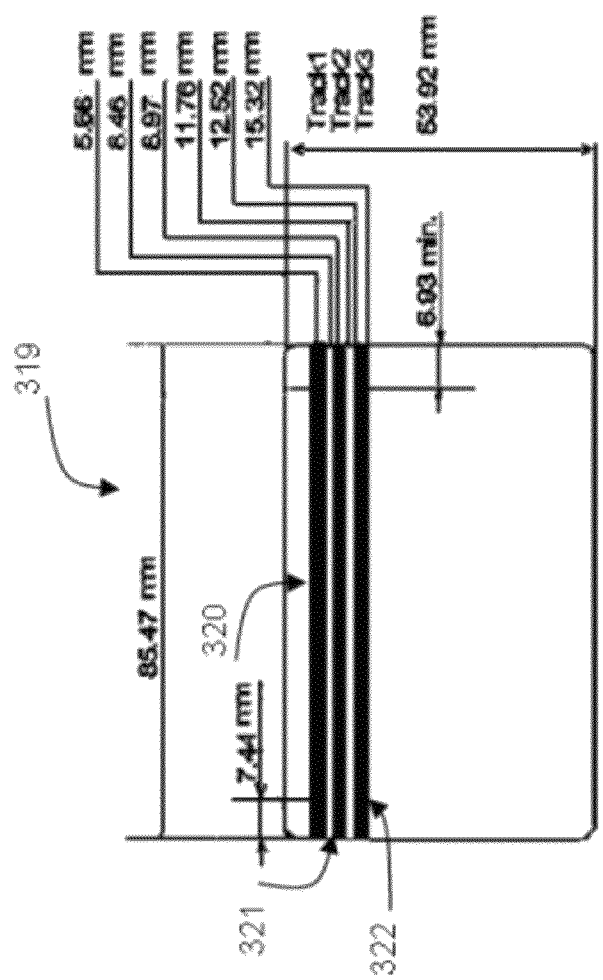
FIG. 3B shows a credit cards three track's structure.

After the PIN code is authenticated by the authentication unit, then the magnetic stripe 112 is opened for reading by flowing current to the two coil 113, 114—as shown on FIG. 3. In addition, the data gate in the 7816 connector 201 is opened. The two coils 113, 114 generate an appropriate magnetic field in the entire magnetic stripe 112 by substituting for the missing magnetic bits. Since it is not possible to read an incomplete magnetic stripe 112, by the time the 7816 blocking unit opens the Mosfet gate, the missing information from the magnetic stripe 112 is already emulated. If the PIN code is not validated, then the magnetic stripe 112 and 7816 connector 201 will not be available and the card 100 will not be available for reading.

Figure 5A:
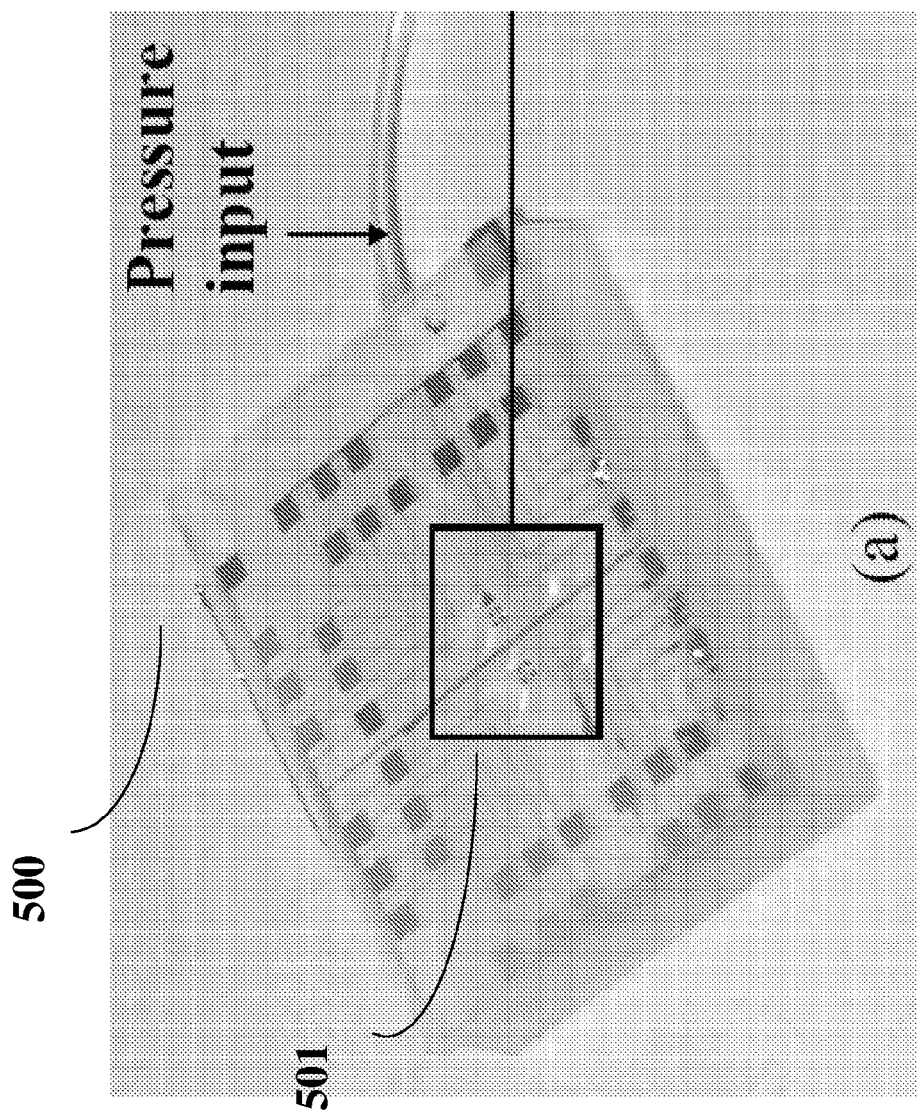
FIG. 5A shows the MEMS pressure nanosensor.

The transaction card 100 of the invention is able to discover and prevent a fraudulent situation of a transaction card 100 being consecutively or simultaneously read by two reading magnetic heads 401,402, by using one or more intrusion detectors (sensors) 111, 110—as shown in FIG. 3A and FIG. 4. Each of the detectors is an assembly of two sensors 111, 110. The first sensor 110 is a nanosensor which measures the mechanic pressure applied on the magnetic stripe 112 by using a Carbon Nano Tube (CNT)—MWNT 502 shown in FIG. 5B which is based on Micro Electro Mechanical System (MEMS) 500 piezoresistive Pressure sensors (shown in FIG. 5A). Details on nanosensors can be found in "Fabrication of CNT-Based MEMS Piezoresistive Pressure Sensors Using DEP Nanoassembly" by Carmen K. M. Fung, Maggie Q. H. Zhang, Zaili Dong and Wen J. Li [Centre for Micro and Nano Systems, The Chinese University of Hong Kong] incorporated herein by reference. The second sensor 111 is a magnetic sensor. Details on TESLA magnetic sensors can be found in "AC Biased Sub-Nano-Tesla Magnetic Field Sensor for Low-Frequency Applications Utilizing Magnetoimpedance in Multilayer Films" by Paul Delooze, Larissa V. Panina, and Desmond J. Mapps [Department of Communications and Electronic Engineering, University of Plymouth] incorporated herein by reference. The nanopressure sensor is located in a Di Electro Phoretic (DEP) nano assembly, as shown in FIG. 5A.

Figure 5B:
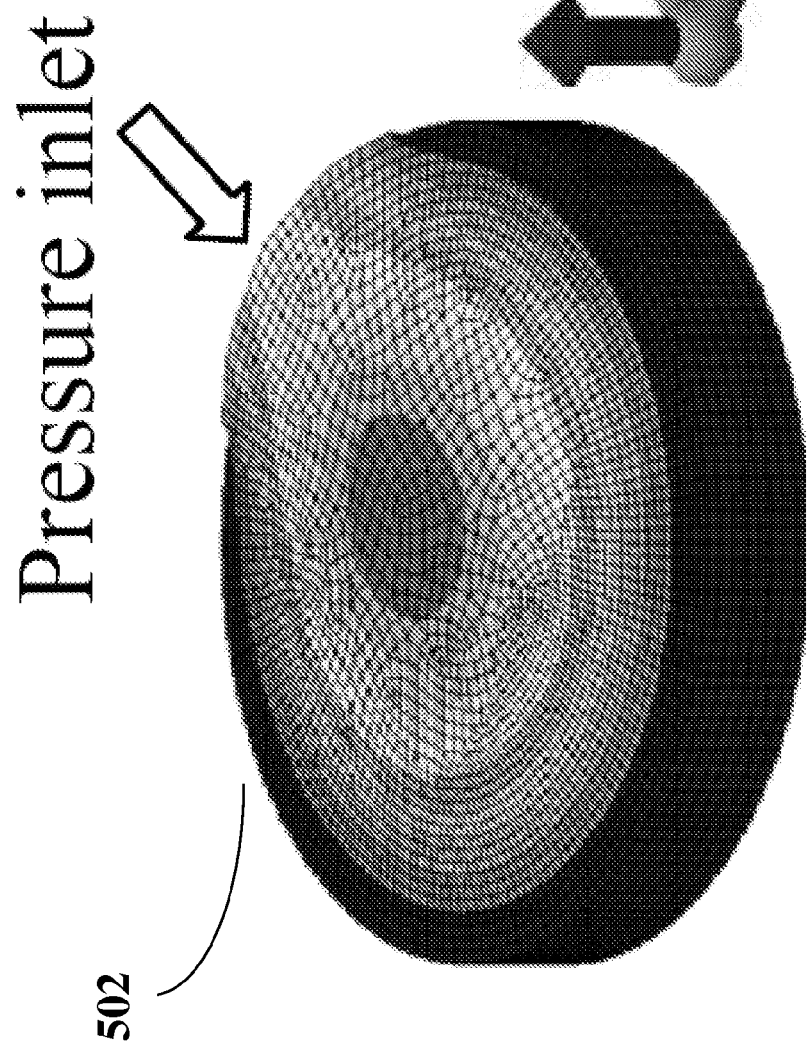
FIG. 5B shows a simulation of a Polymethylmethacrylate (PMMA) pressure sensor with a Multi walled nano tube (MWNT) sensing element.
Figure 6:
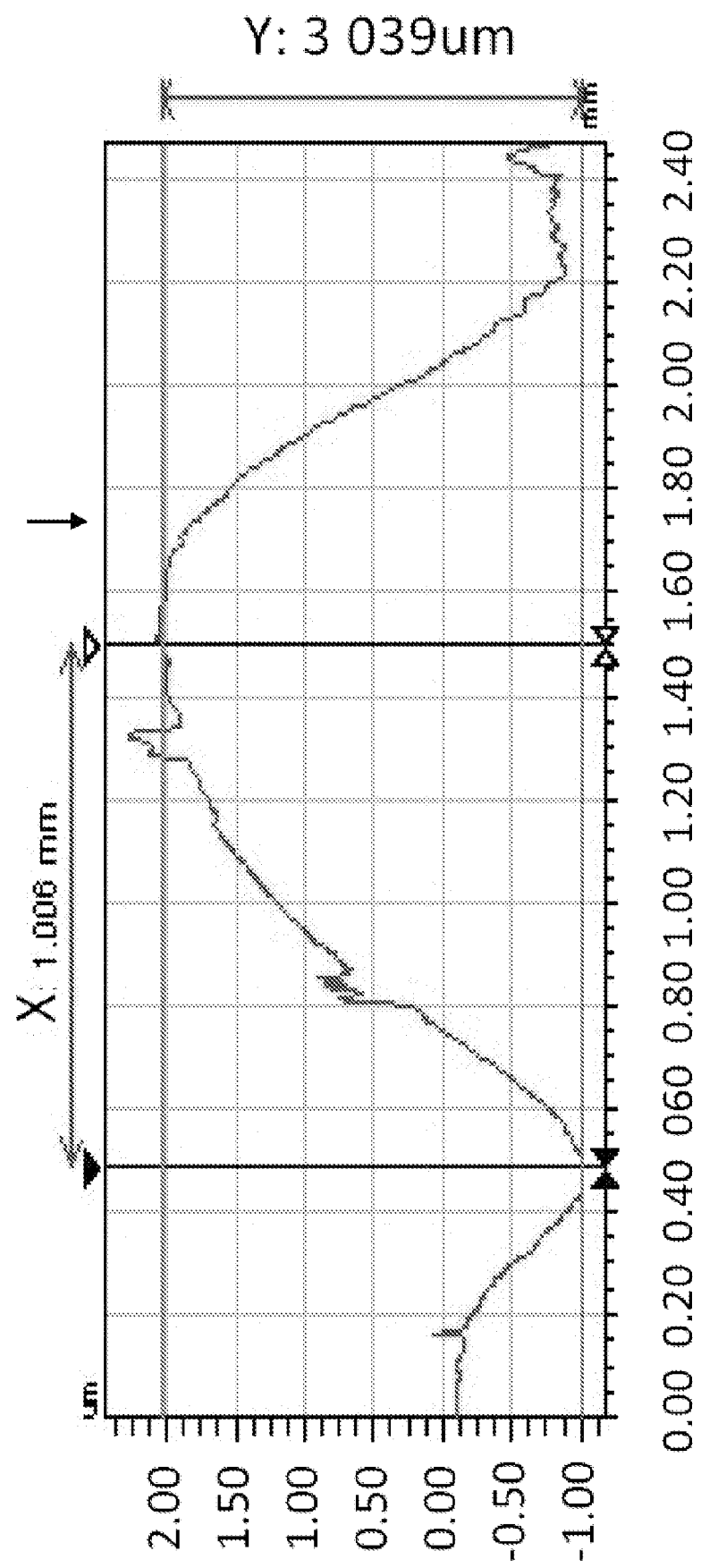
FIG. 6 shows the deflection graph of the pressure sensors.

FIG. 5B shows a simulation of the PMMA 501 (Polymethylmethacrylate) pressure sensor chip with MWNT 502 (Multiwallednanotube) sensing element 501 according to the deflection size 503 of the whole diaphragm of the sensor 110. The scale of the deformed shape is 5% of the stationary size, the maximum deflection is plotted in FIG. 15. A face view of the pressure nanosensor structure is shown in FIG. 12, comprised of WYKO™ interferometer measurement of a PMMA 501 (Polymethylmethacrylate) diaphragm 502 (diameter of 2 mm and thickness of about ~300 μm).

The pressure sensors 110 are also used to charge the battery 102 via the Power Supply Unit (PSU), since each mechanic operation, of the reading magnetic head 401, presses the pressure sensors 110 and creates a limited current that can be used for charging a rechargeable battery 102.

The magnetic sensor 111 in can be based on a Tesla Magnetic Field Sensor in some embodiments. Alternatively, the magnetic sensor 111 can be implemented with simple Faraday pickup coils 113, 114, in which the coils 113, 114, that generate the magnetic bit, can serve for this purpose too. The magnetic sensor 111 measures the changes in the magnetic field that has been created by the magnetic circuit of any magnetic reader. The first detected magnetic head reader 401 is assumed to be a legitimate magnetic head reader, unless a second magnetic head reader 402 is detected.

It is sufficient to use one sensor either a magnetic sensor 111 or a pressure sensor 110. People skilled in the art will appreciate that it is beneficial to use more than one sensor so that the result of the different sensors can be compared thus increasing the overall reliability of the sensor readings.

A first fraudulent scenario is based on two reading magnetic heads 401, 402 installed in the same ATM, clearing machine, the first reading magnetic head 401 is legitimate and the second reading magnetic head is an unauthorized reading magnetic head 402. Both of them 401, 402 are supposed to read the data from the magnetic stripe 112 one after the other. In this case—the magnetic sensor 111 will measure the magnetic field's level created by the magnetic circuit as well as measuring the mechanical pressure of the two readers 401, 402, and in a case of a measurement indicating a second reader 402, the CPU 103 will turn off the "OK FLAGS" and will send a disable ("cut off") command to the coils 113, 114 in order to block the magnetic stripe 112, as well as to switch off the 7816 terminal 201. The disabling of the magnetic stripe 112 can be achieved before the data has been read off the magnetic data stripe 112. This technique can be based on two feedbacks: the first one is from the magnetic sensor circuit 111, and the second is from the pressure circuit 110, both of them in order to disable with high probability the operation of the second, fraudulent magnetic head 402.

A second scenario exists when a legitimate user makes what he thinks is a legitimate transaction such as paying for a product or service at what appears to be a legitimate place of business. A specious vendor might swipe the card 100 in a legitimate clearing machine first, but then swipe the card 100 immediately thereafter in a second reading machine whose aim is to clone the card 100. The one or more sensors of the invention track the magnetic and/or pressure characteristics (signature) of the first reader, and compare it to the findings of an immediate second reading. If the second reading (coming a predetermined amount of time after a first reading, for example, under 5 minutes), produces a different signature then the first reading, then it will be assumed that the card was exposed to two different reading magnetic heads 401, 402, and one of them will be assumed to be an unauthorized magnetic reading head. As a consequence, the CPU 103 will turn off the OK flags while the disable unit will block the magnetic stripe 112 and the 7816 connector 201. In some embodiments, the PSU will switch off. If the two signatures are identical, or sufficiently close to each other, it will be assumed that the card 100 was read twice by the same reading magnetic head 401, as is often the case when the transaction does not go through (for example, when the communication breaks to the authentication server of the financial clearing company).

Figure 7:
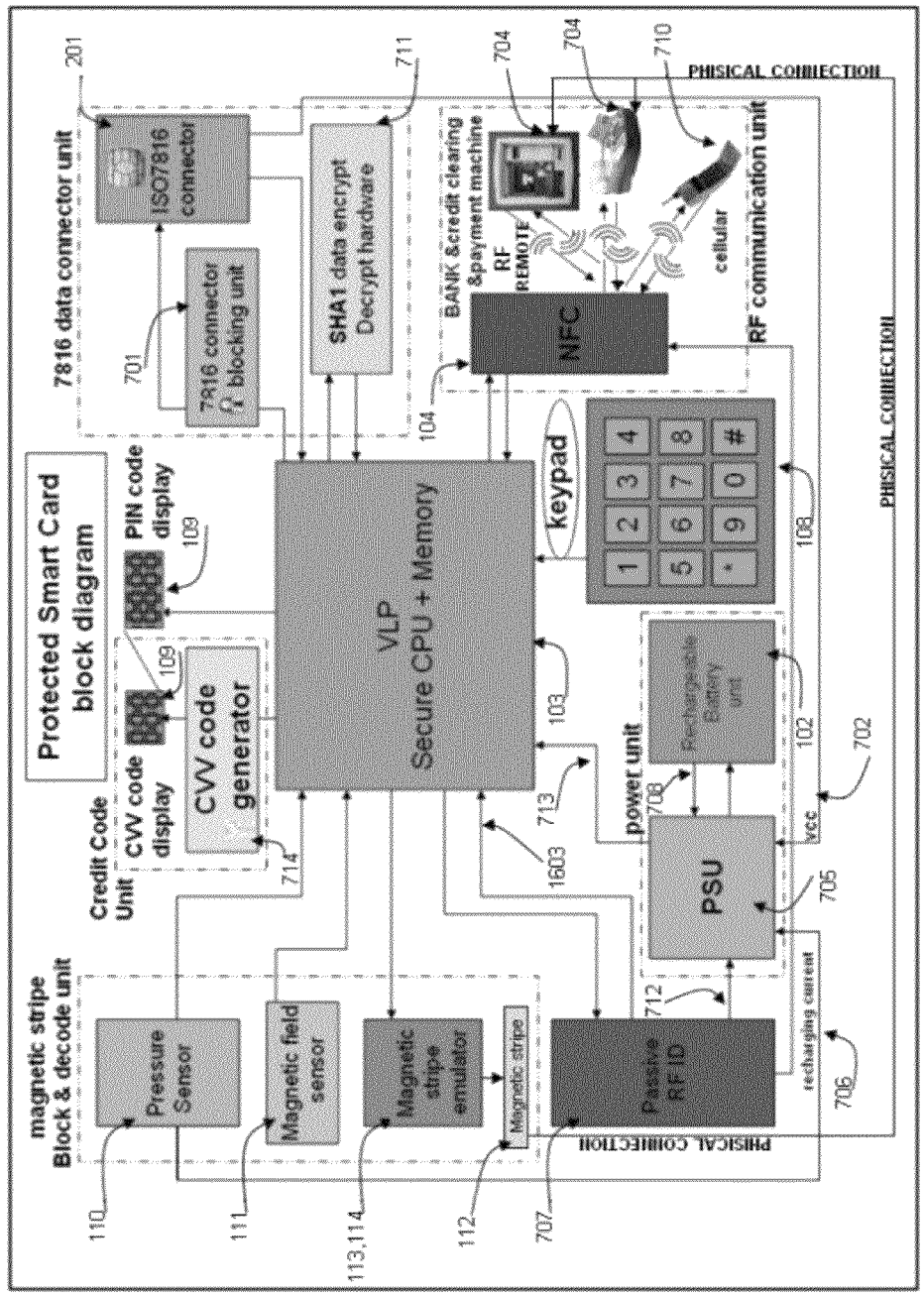
FIG. 7 illustrates an exemplary block diagram of the main components of a transaction card of the invention.

FIG. 7 illustrates the main components of the transaction card 100 of the invention. The main parts of the transaction card 100 comprise a CPU 103 and a memory for applying the various algorithms connected with securing the card 100. The CPU 103 has input and output channels, those comprise output channels for partial magnetic emulation and input channels for detecting fraudulent reading magnetic heads based on magnetic 111 and/or pressure sensors 110. The transaction card 100 comprises a passive RFID unit 707 which allows the card 100 to identify itself to readers remotely in a dynamic fashion. Power 705 is supplied either remotely using an antenna 1602 or by wire 708 using a rechargeable battery 102. The rechargeable battery 102 is connected to a Power Saving Unit (PSU) 705 and can use either the power terminal 702 at the 7816 connector 201 or the current 706 manufactured by the pressure sensor 110 (inside the MEMS 500) in each manual or automatically operation. A keypad 108 is supplied in order to activate the card 100 using a PIN code or any other authentication mean known in the art (biometric authentication, communicating with an external device etc.). Alternatively, the PIN code can be entered using a cellular phone 710 remote control through a NFC (Near Field Communication) device 104. The same device 104 can communicate with a credit or clearing machine 704 authenticating the card 100 to the machine 704 and vice versa authenticating the machine 704 to the card 100. Data can be encrypted, for example, by using a SHA1 711 (Secure Hash Algorithm) data encryption hardware. A 7816 standard chip unit 201 is available on the card 100.

One feature that can greatly enhance the security of the transaction card 100 is enabling the card to communicate with nearby devices 104. Using common communication technologies such as but not limited to RFID 704, enables the authentication unit to retrieve more information such as to verify the user's ID, his location by getting his location through the cellular phone 710 or authenticate the credit card 100 reader 401 or ATM 704 identity and its location. The combination of these factors will facilitate a better identification of the user based on existing low cost hardware with a minor mechanic and electronic modification in the existing devices.

Figure 17:
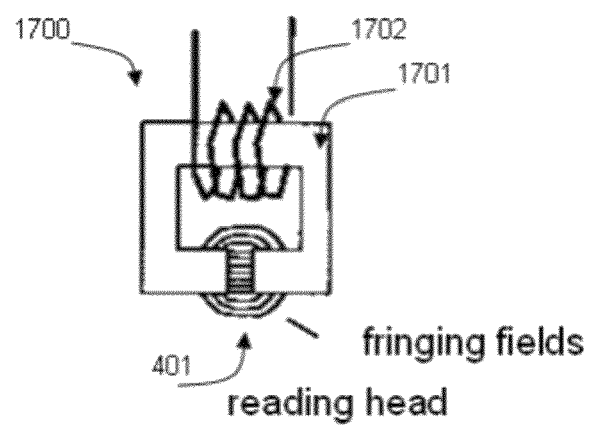
FIG. 17 shows a reading magnetic head.

I. PARTIAL EMULATION OF THE MAGNETIC STRIPE OF A TRANSACTION CARD 1.1 Introduction A magnetic stripe 112 credit card 100 is a type of transaction card 100 capable of storing data by modifying the magnetism of tiny iron-based magnetic particles on a band of magnetic material on the card 100. The magnetic stripe 112, sometimes called a magstripe 112, is read by physical contact and swiping past a reading magnetic head 1700 as shown in FIG. 17. Magnetic stripe 112 cards are commonly used in credit cards, identity cards, transportation tickets, corporate presence registers, student cards, library cards and many other implementations. Some new cards 100 may also contain a Radio Frequency Identification (RFID) 707 tag, a transponder device and/or a microchip 103, 201 mostly used for business premises access control or electronic payment.

A number of International Organization for Standardization standards, ISO/IEC 7810, ISO/IEC 7811, ISO/IEC 7812, ISO/IEC 7813, ISO 8583, and ISO 4909 define the physical properties of the transaction card 100, including size, flexibility, location of the magnetic stripe 112, magnetic characteristics 800, and data formats. They also provide the standards for financial cards, including the allocation of card number ranges to different card issuing institutions.

The Magnetic Stripe

In most magnetic stripe 112 cards 100, the magnetic stripe 112 is contained in a plastic, like film. The magnetic stripe 112 is located 0.223 inches (5.66 mm) from the edge of the card 319, and is 0.375 inches (9.52 mm) wide. The magnetic stripe contains three tracks 320, 321, 322, each 0.110 inches (2.79 mm) wide. Tracks one 320 and three 322 are typically recorded at 210 bits per inch (8.27 bits per mm), while track two 321 typically has a recording density of 75 bits per inch (2.95 bits per mm). Each track can either contain 7 bit alphanumeric characters, or 5 bit numeric characters. Track 1 320 standards were created by the airlines industry (IATA). Track 2 321 standards were created by the banking industry (ABA). Track 3 322 standards were created by the Thrift-Savings industry.

Magstripes 112 following these specifications can typically be read by most point-of-sale hardware 704, which are simply general-purpose computers that can be programmed to perform specific tasks. Examples of cards adhering to these standards include ATM 704 cards, bank cards (credit and debit cards including VISA™, MasterCard™, American Express™, and Diners™), gift cards, loyalty cards, driver's licenses, telephone calling cards, membership cards, electronic benefit transfer cards (e.g. food stamps), and nearly any application in which value or secure information is not stored on the card itself. Many video game and amusement centers now use debit card systems based on magnetic stripe 112 cards 100.

Magnetic stripe 112 cloning can be achieved by the implementation of magnetic card reader heads 1700 and firmware that can read a signature embedded in all magnetic stripes 112 during the card production process. This signature known as a "MagnaPrint" or BluPrint can be used in conjunction with common two factor authentication schemes utilized in ATM 704, debit/retail point-of-sale 704 and prepaid card applications.

Magnetic Stripe Coercivity

Figure 8:
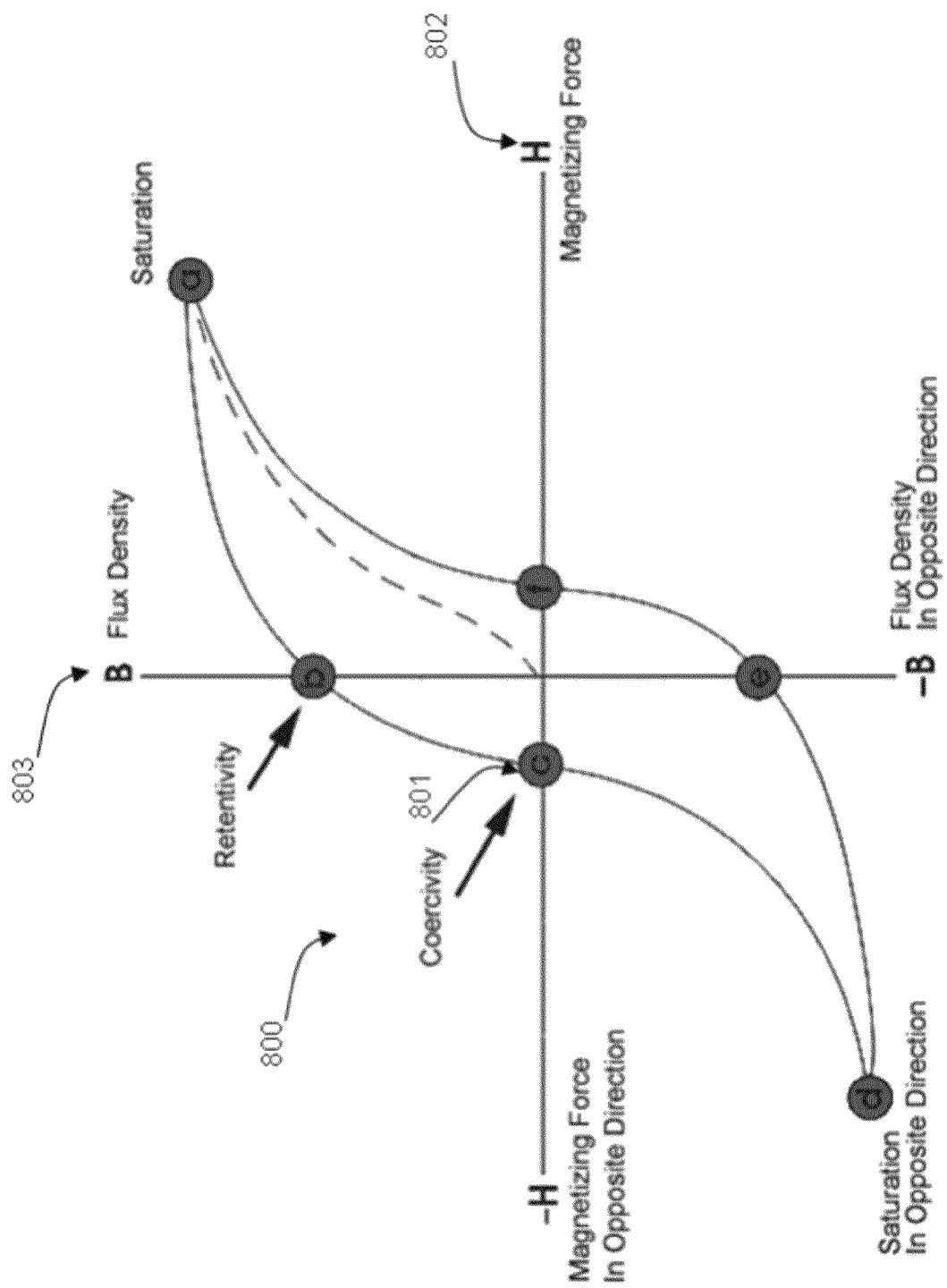
FIG. 8 shows a graph of a generic hysteresis loop of a magnetic material such as the magnetic material of which the magnetic strip of the credit card is made of. The curve shows the relation between a magnetic field and the magnetic flux density. Special points of technological importance such as saturation, retentivity and coercivity are designated.

The connection between the magnetic field $\vec{H}$ 802 and the magnetic flux density $\vec{B}$ 803 in a magnetic material is dependent on the materials history that is on the value of the magnetic field and magnetic flux density at the time in which a magnetic change is introduced. This results in a hysteresis 800 curve shown in FIG. 8.

The magnetic field $\vec{H}$ 802 and the magnetic flux density $\vec{B}$ 803 are connected through the equation (in CGS units):

$$\vec{H} = \vec{B} - 4\pi\vec{M}. \tag{1}$$

Figure 9:
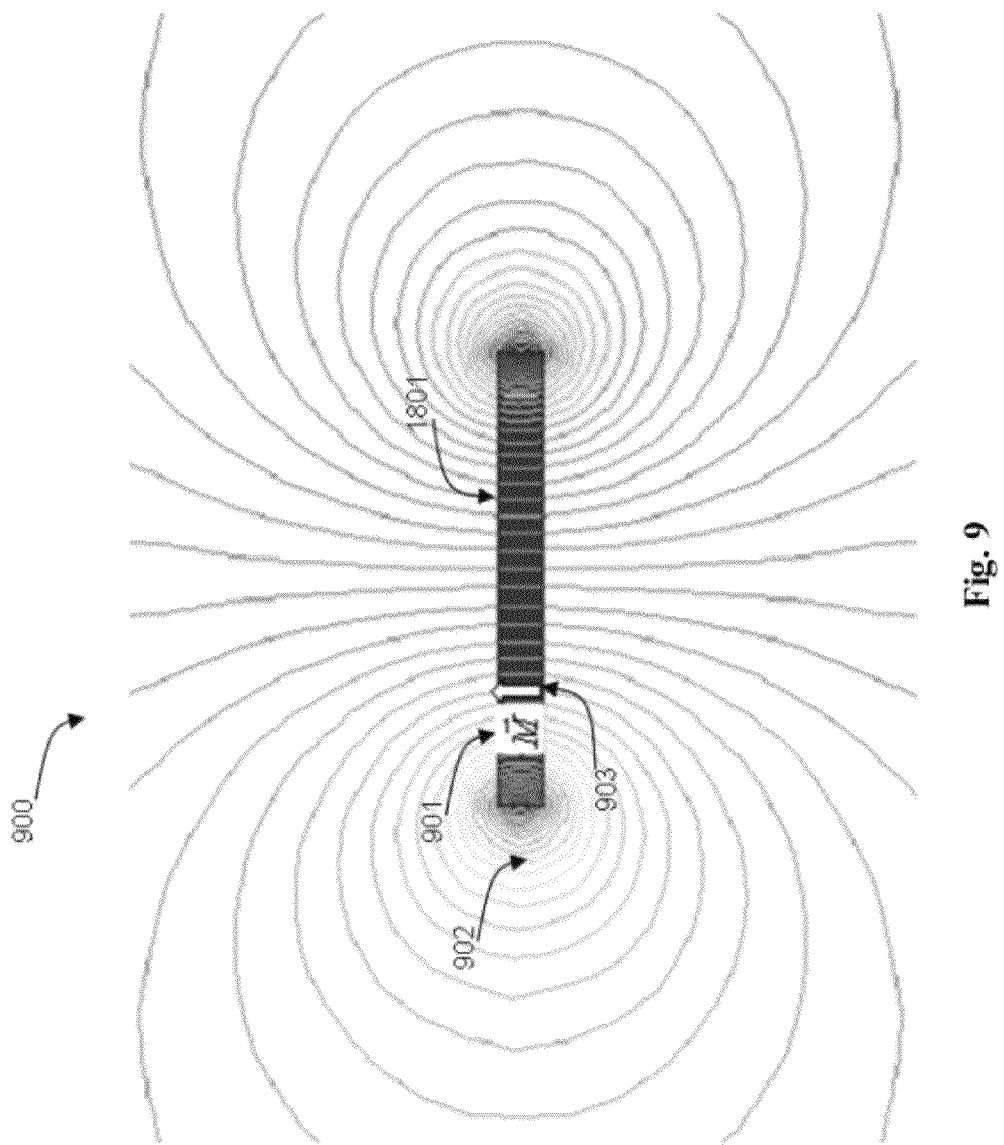
FIG. 9 shows the magnetic field which originates from a magnetic box (magnetic bit), the magnetization of the material is designated along with its direction.

In which $\vec{M}$ 901 in FIG. 9 is the magnetization of the material and is equal to the magnetic dipole density, this quantity usually depends on $\vec{H}$ 802. The magnetic field coercivity 801 is the point in which an opposite direction magnetic field produces a null magnetic field flux. Magstripes 112 come in two main varieties: high-coercivity 801 (HiCo) at 4000 Oersted (Oe) and low-coercivity 801 (LoCo) at 300 Oe but it is not infrequent to have intermediate values at 2,750 Oe. High-coercivity 801 magstripes are harder to erase, and therefore are appropriate for cards 100 that are frequently used or that need to have a long life. Low-coercivity 801 magstripes 112 require a lower amount of magnetic energy to record, and hence the card writers are much cheaper than machines which are capable of recording high-coercivity magstripes 112. A card reader 1700 can read either type of magstripe 112, and a high-coercivity card writer may write both high and low-coercivity 801 cards (most have two settings, but writing a LoCo card in HiCo may sometimes work), while a low-coercivity 801 card writer may write only low-coercivity 801 cards.

In practical terms, usually low coercivity 801 magnetic stripes 112 are a light brown color, and high coercivity stripes are nearly black; exceptions include a proprietary silver-colored formulation on transparent American Express™ cards. High coercivity 801 magnetic stripes 112 are resistant to damage from most magnets likely to be owned by consumers. Low coercivity 801 stripes are easily damaged by even a brief contact with a magnetic purse strap or fastener. Because of this, virtually all bank cards 100 today are encoded on high coercivity 801 stripes 112 despite a slightly higher per-unit cost.

Figure 18:
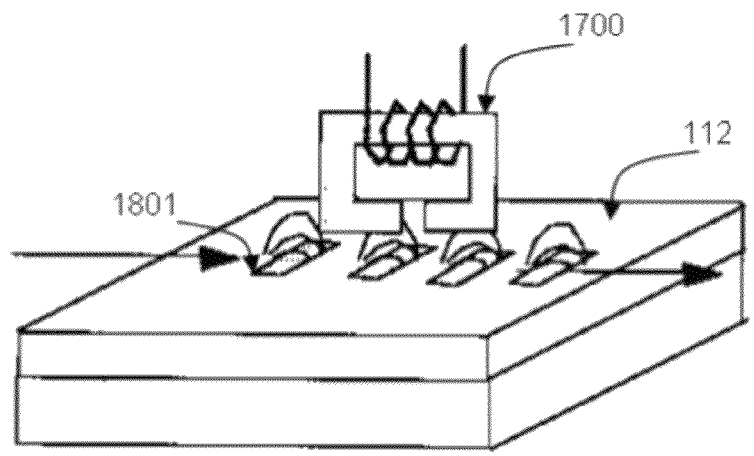
FIG. 18 shows the Bit's effect on a magnetic detector.

FIG. 9 shows the magnetic field 902 which originates from a magnetic box (magnetic bit) shown as 1801 in FIG. 18, the magnetization 901 of the material is designated along with its direction 903.

Magnetic stripe 112 cards are used in very high volumes in the mass transit sector, replacing paper based tickets with either a directly applied magnetic slurry or hot foil stripe 112. Slurry applied stripes 112 are generally less expensive to produce and are less resilient but are suitable for cards 100 meant to be disposed after a few uses.

Financial Cards

There are up to three tracks 319 on magnetic cards 100 used for financial transactions, known as track-1 320, track-2 321, and track-3 322. Track-3 322 is virtually unused by the major worldwide networks such as VISA™, and often isn't even physically present on the card 100 by virtue of a narrower magnetic stripe 112. Point-of-sale card readers 1700 almost always read track-1 320, or track-2 321, and sometimes both 320, 321, in case one track is unreadable. The minimum cardholder account information needed to complete a transaction is present on both tracks 320,321. Track-1 320 has a higher bit density 1801 (210 bits per inch vs. 75), and it is the only track that may contain alphabetic text, and hence is the only track 320 that contains the cardholder's name.

The information on track-1 320 on financial cards 100 is contained in several formats: A, which is reserved for proprietary use of the card issuer, B, which is described below, C-M, which are reserved for use by ANSI Subcommittee X3B10 and N-Z, which are available for use by individual card issuers:

Track One 320, Format B:
Start sentinel—one character (generally '%')
Format code="B"—one character (alpha only)
Primary account number (PAN)—up to 19 characters. Usually, but not always, matches the credit card number printed on the front of the card.
Field Separator—one character (generally '^')
Name—two to 26 characters
Field Separator—one character (generally '^')
Expiration date—four characters in the form YYMM.
Service code—three characters
Discretionary data—may include Pin Verification Key Indicator (PVKI, 1 character), PIN Verification Value (PVV, 4 characters), Card Verification Value or Card Verification Code (CVV 109 or CVK, 3 characters)
End sentinel—one character (generally '?')
Longitudinal redundancy check (LRC)—one character (Most reader devices 1700 do not return this value when the card 100 is swiped to the presentation layer, and use it only to verify the input internally to the reader 1700)

Track Two 321
This format was developed by the banking industry (ABA). This track 321 is written with a 5-bit scheme (4 data bits+1 parity), which allows for sixteen possible characters, which are the numbers 0-9, plus the six characters : ; < = > ?. The selection of six punctuation symbols may seem odd, but in fact the sixteen codes simply map to the ASCII range 0x30 through 0x3f, which defines ten digit characters plus those six symbols. The data format is as follows:

Start sentinel—one character (generally ';')
Primary account number (PAN)—up to 19 characters. Usually, but not always, matches the credit card number printed on the front of the card.
Separator—one char (generally '=')
Expiration date—four characters in the form YYMM.
Service code—three characters
Discretionary data—as in track one
End sentinel—one character (generally '?')
LRC—one character—(It should be noted that most reader devices do not return this value when the card is swiped to the presentation layer, and use it only to verify the input internally to the reader 1700.)

Other Card Types

Smart cards are a newer generation of cards containing an integrated circuit chip 103, 201. The card may have metal contacts 201 connecting the card 100 physically to external devices 704, while contactless cards use a magnetic field or radio frequency (RFID) 707 for proximity reading.

Hybrid smart cards comprising a magnetic stripe 112 in addition to the chip 201—this is most commonly found in a payment cards 100, so that the cards 100 are also compatible with payment terminals that do not comprise a smart card reader terminal 201.

II. EMULATION

The value of magnetostatic fields 902 is determined by the following Maxwell equations (CGS units):

$$\vec{\nabla} \cdot \vec{B} = 0 \qquad (2)$$

$$\vec{\nabla} \times \vec{H} = \frac{4\pi}{c} \vec{J} \qquad (3)$$

$$\vec{\nabla} \cdot \vec{J} = 0 \qquad (4)$$

In which c is the speed of light and $\vec{J}$ is the current density. Inserting the magnetic flux density definition from equation (1) we obtain:

$$\vec{\nabla} \times (\vec{B} - 4\pi \vec{M}) = \frac{4\pi}{c} \vec{J}. \qquad (5)$$

That is:

$$\vec{\nabla} \times \vec{B} = \frac{4\pi}{c} (\vec{J} + \vec{J}_M). \qquad (6)$$

In which:

$$\vec{J}_M = c \vec{\nabla} \times \vec{M} \qquad (7)$$

Hence one can produce a detectable magnetic flux density either by using a magnetized material or by using a current. In the following we shall calculate the current equivalent to the magnetization of a single bit 1801.

Let us suppose that the direction of magnetization is the z direction 903 $\vec{M}=M\hat{z}$ 901 in this case we arrive at the following equation:

$$\vec{J}_M = c\left(\hat{x}\frac{\partial M}{\partial y} - \hat{y}\frac{\partial M}{\partial x}\right) \quad (8)$$

A reasonable assumption is that the magnetization is uniform within the bit that is:

$$M = M_0 \cdot \left(u\left(x+\frac{1}{2}a\right) - u\left(x-\frac{1}{2}a\right)\right) \cdot \left(u\left(y+\frac{1}{2}b\right) - u\left(y-\frac{1}{2}b\right)\right) \cdot \left(u\left(z+\frac{1}{2}C\right) - u\left(x-\frac{1}{2}C\right)\right) \quad (9)$$

In the above it is assume that the bit has dimensions a,b,C in the x,y,z directions respectively and u is the standard step function. Inserting the above equation (9) into equation (8) we arrive at the expression:

$$\vec{J}_M = cM_0 \cdot \left(u\left(z+\frac{1}{2}C\right) - u\left(x-\frac{1}{2}C\right)\right) \cdot \begin{pmatrix} \hat{x}\left(u\left(x+\frac{1}{2}a\right) - u\left(x-\frac{1}{2}a\right)\right) \cdot \left(\delta\left(y+\frac{1}{2}b\right) - \delta\left(y-\frac{1}{2}b\right)\right) - \\ \hat{y}\left(\delta\left(x+\frac{1}{2}a\right) - \delta\left(x-\frac{1}{2}a\right)\right) \cdot \left(u\left(y+\frac{1}{2}b\right) - u\left(y-\frac{1}{2}b\right)\right) \end{pmatrix}. \quad (10)$$

In which $\delta$ is the impulse function also denoted as Dirac's delta function. Hence we arrive at rectangular 1002 solenoid of the form described in FIG. 10:

The current through the solenoid bit 1002 can be readily calculated as:

$$I = \int \vec{J}_M \cdot d\vec{S}\Big|_{y=-\frac{1}{2}b} \quad (11)$$
$$= \int J_{Mx} dy dz \Big|_{y=-\frac{1}{2}b}$$
$$= cM_0 C\left(u\left(x+\frac{1}{2}a\right) - u\left(x-\frac{1}{2}a\right)\right) \text{ statamperes}$$

Since 1 statampere=⅓*10⁻⁹ amperes and c=3*10¹⁰ cm/second we arrive at the following current along the wire:

$$I = 10 M_0 C \text{ amperes} \quad (12)$$

In which $M_0$ is given in magnetic moment per cm³ and C in cm. For the high density track 319 a bit 1801 size is 2.79 mm×0.123 mm and hence C=0.0123 cm, while for the low density track 319 a bit 1801 size is 2.79 mm×0.339 mm and hence C=0.0339 cm. The material magnetization of Gamma ferric oxide ($\gamma$-$Fe_2O_3$) of which the magnetic stripe 112 is made of is given by $M_0 \cong 414$ KA/m in MKS units or $M_0 \cong 414$ magnetic moment per cm³ (Handbook of physics and chemistry, however, other sources give lower numbers). Thus we need 50 Amperes for a high density 803 tracks 320, 322 and 140 Amperes for a low density track 321. Those numbers can be reduced 1900 by having additional windings, the current 1002 is then divided by the number of windings.

III. SENSORS FOR DETECTING FRAUDULENT CARD READING

Figure 11:
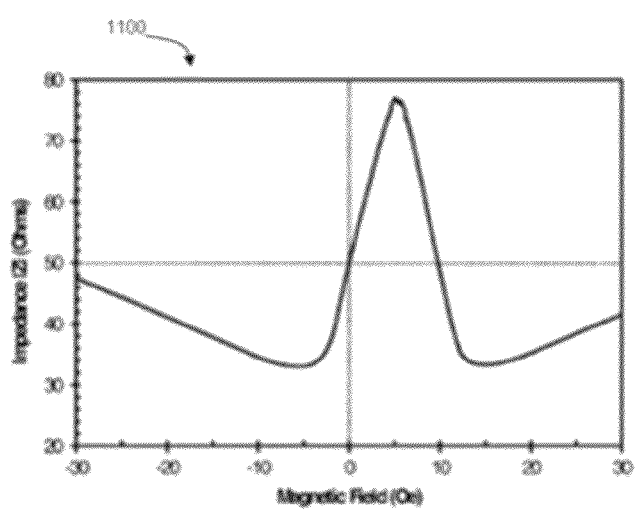
FIG. 11 shows the measured impedance of the sub-nano Tesla magnetic field sensor.

FIG. 11 shows the impedance of the film system bias with 5 Oe and matched to 50Ω. The graph shows the measured impedance of the sub-nano Tesla magnetic field 902 sensor 111 magnetic field sensor's element 1200 as shown in FIG. 12.

FIG. 12 shows the illustration of the sensor elements structure, along with the excitation and biasing quantities. The element is manufactured via radio frequency (RF) sputtering, comprising of electrical connectors 1201, sub nano Tesla magnetic field sensor 1202 based on $CO_2$ gate 1203 separated from $CO_1$ bias 1206 and $CO_3$ semiconductor reference 1204, and $Al_2O_3$ insulation layers 1205.

FIG. 13 shows the Resistance-pressure dependency of a typical MWNT (Multi walled nano tube) 501 pressure nanosensor for 3 different measurements. The graph shows the resistance-pressure dependency of a typical MWNT 501 pressure sensor 110 for 3 different measurements. The solid line with the cross marker is the theoretical expectation of the resistance contribution from gold electrodes.

Figure 14:
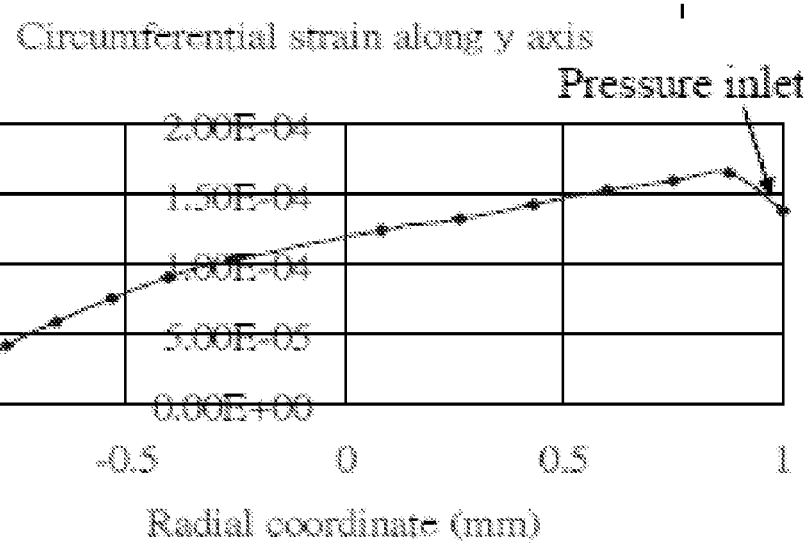
FIG. 14 is a graph of the strain profile under 60 kPa pressure along the symmetrical axis of the diaphragm. The graph shows the circumferential strain profile under 60 kPa pressure along the symmetrical axis of the diaphragm from FEM (Finite element method) simulation.

FIG. 14 shows the strain profile under 60 kPa pressure along the symmetrical axis of the diaphragm. The graph shows the circumferential strain profile under 60 kPa pressure along the symmetrical axis of the diaphragm from FEM (Finite element method) simulation.

Figure 15:
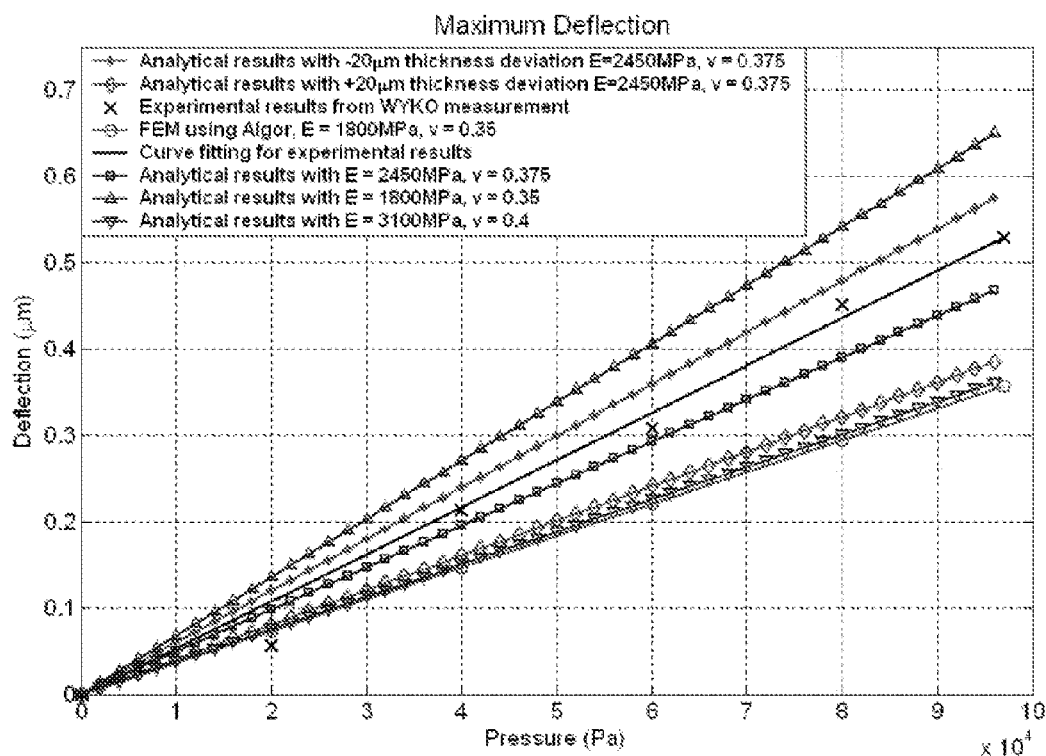
FIG. 15 shows a plot of the maximum deflection at the center of the diaphragm from FEM simulation, analytical calculations and experiment as a function of pressure. The graph shows a comparison of theoretical results, after modeling and WYKO™ interferometer experimental measurement of the deflection at the center of the diaphragm due to the input pressure's variation.

FIG. 15 shows a plot of the maximum deflection at the center of the diaphragm as the function of pressure. The graph shows a comparison of theoretical results after modeling and WYKO™ 500 interferometer experimental measurement of the deflection at the center of the diaphragm due to the input pressure variation is shown in this graph.

Figure 16:
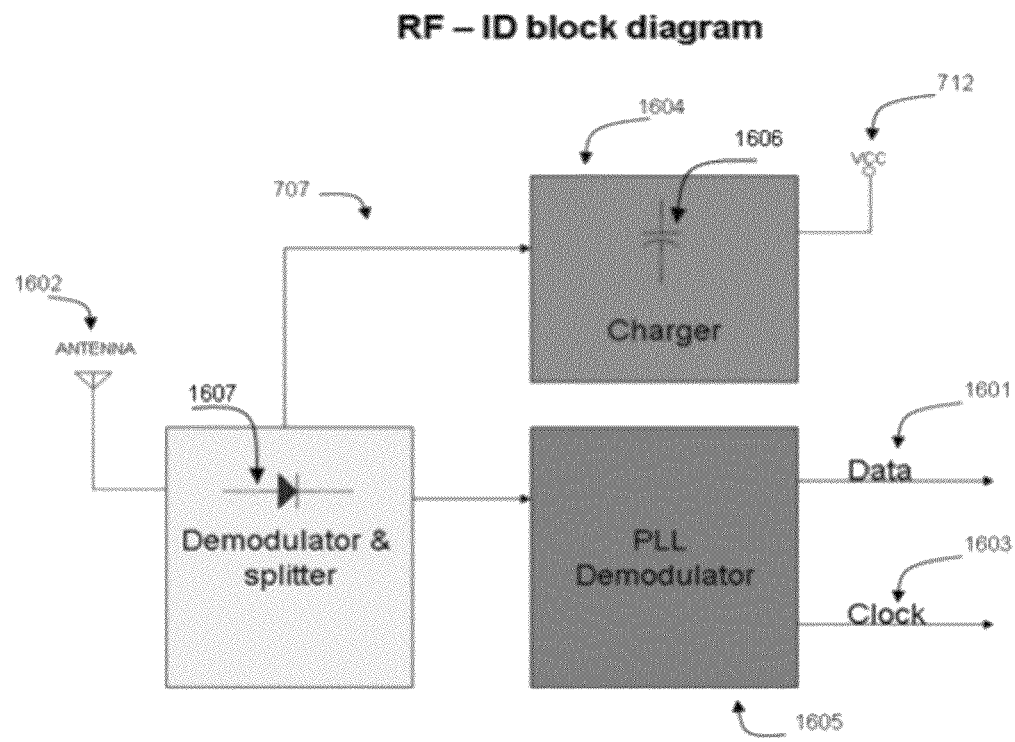
FIG. 16 illustrates the RFID block diagram, comprising the RF charger unit and the data demodulator. The Voltage Control (VCC) input connects either to the PSU (power supply unit)—as illustrated in FIG. 7, or to the 7816 hardware connection and is supplied from the main 7816 connector or as a product of the rectified RF signal. Thus power can be supplied to the card either by the RF charger or by the 7816 connector when it is connected.

FIG. 16 illustrates the RFID 707 block diagram, comprise of RF charger unit 1604 and a data 1601 demodulator, which the signal is fed into, and processed by its PLL (phase locked loop) unit 1605.

The Voltage Control (VCC) input 712 connects either to the PSU (power supply unit) 705—or to the 7816 hardware connection 201 and will be supplied from the main 7816 connector 201 or as a product of the rectified RF signal 1606. Thus power can be supplied 713 to the card 100 electrical elements either by the RF charger 1604 or by the 7816 connector 201 when it is connected.

FIG. 17 shows a reading magnetic head's 1700 structure, comprising an iron magnetic circuit 1701 and a coil 1702

FIG. 18 shows the bits 1801 effect on a reading magnetic head 1700. If there are two reading magnetic heads 401, 402 present then it most probably means that one of them 402 is installed in order to fraudulently extract the details from the magnetic stripe 112 in order to illegally clone the card 100.

The Pressure Sensor

An example of a pressure sensor 110 is the novel carbon nanotubes (CNT) 501 based MEMS 500 pressure nanosensor with piezoresistive gauge factor and is potentially more sensitive then polysilicon based sensors. By using the dielectrophoretic (DEP) nanoassembly of CNT 501 and MEMS 500 compatible process, researchers successfully integrated bundled stands of CNT 501 sensing elements arrays 501 of Polymethacrylate (PMMA) diaphragms 502. The piezoresistive effects of CNT 501 were preliminarily investigated by measuring the pressure resistance dependency of the sensors and preliminary results indicated that the CNT 501 based micro sensors were capable of sensing micro pressure variations. In order to characterize the piezoresistivity of CNT 501, we have to calculate the deflection and strain distribution in the diaphragm 502. The MEMS sensor 500 can be used also to recharge 706 the battery 102 during the manual swiping operation of the transaction card 100, for example, when going through an ATM machine 704.

The deflection w of a clamped circular plate under uniform applied pressure P is given by the following formula:

$$w = \frac{Pa^k}{64D}\left[1-\left(\frac{r}{a}\right)^2\right]^2 \quad (13)$$

Where r, a are the radial coordinate and diaphragm radius, D is the flexural rigidity, and is given by:

$$D = \frac{Eh^2}{12(1-v^2)} \quad (14)$$

Where E, h and v are the modulus, plate thickness and Poisson's ratio. Examining of w and D implies the diaphragm will exhibit a maximum strain at the center therefore it will be the ideal place for the nanotubes location.

The Magnetic Detector

The magnetic head 1700 is made of a soft magnetic material (mu-iron) 1701 that is magnetized by the bit 1801 magnetic field 902 and in turn causes a change of the magnetic field on the card 100; this can be described alternatively as "pulling" of the magnetic field lines 902 by the reading magnetic head 1700.

Since the depletion of magnetic field 902 lines is a time dependent effect, one may use Faraday's law given in equation (15) below:

$$\varepsilon = \oint \vec{E} \cdot d\vec{r} = \frac{-d\Phi_M}{dt} \quad (15)$$

$$\Phi_M = \int \vec{B} \cdot d\vec{S} = \int \vec{B} \cdot \hat{n}\, dS$$

The law states that given a change in the magnetic field 902 on the card 100 such as in the time that the card 100 is passed through a magnetic head 1700, a voltage difference will appear on the coils 113, 114 presented on the card 100.

Figure 19:
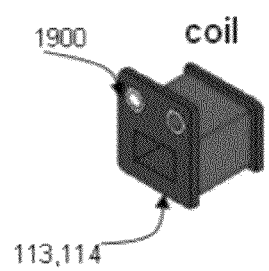
FIG. 19 shows an embodiment of a rectangular coil, the coil has the size of a single bit.

FIG. 19 shows the use of "active bit" 1900 coils 113, 114, or a different specialized coil to detect the presence of the magnetic heads 401, 402 by a state machine made of latches (or flip-flops).

Another possibility is to detect the presence of the second "fraudulent" magnetic field by the TESLA detector 2023.

The above are only examples of a magnetic detector, other possible magnetic sensors are not excluded from the present invention (E.g. HALL PROBE, NMR PROBE etc.).

IV. CARD'S COMMUNICATIONS INTERFACE

The transaction card 100 of the invention can be equipped with communications capabilities 104 in order to exchange information with an external devices 710, 704 typically a card reader. It can be very useful to fight fraud if the card reader 704 (ATM machine, PoS terminal) and the card 100 itself engage in a process to authenticate each other before data is allowed to be read from the transaction card 100.

In certain embodiments, the card 100 of the invention remains locked 2013, meaning it is unreadable by a card reader device 704, until the card reader device 704 has authenticated itself 2014, 2022 as a legitimate and authorized card reader device 714.

The card 100 of the invention can use any available communication technology. One suitable and available technology today is RFID 707, which can be used to communicate with nearby card reader devices 704.

RFID 707 technology can be used for two purposes: The first for communication 2014 and charging 712 (powering) the RFID card read device 704. Typically, the transaction card 100 of the invention has its own power source (battery) 102 and does not need to rely upon RFID charging 712. RFID charging 712 is based on RF energy with a high frequency, for example −13.56 MHz, the energy can be received by the built-in antenna 1602 rectified and accumulated in a small capacitor 1606 and directed to the battery charging circuitry 712 for charging the battery 102. A second possible usage is based on modulated RF frequency which passes through an envelope diode detector 1607 for detecting and converting the frequency modulated signal into a stream of data 1601. Demodulating the data can be done by direct processing of the radio signal in the digital core (DSP function) of the CPU 103.

In certain embodiments, the modulation is the mean frequency shift keying (FM-FSK) modulator 104—this is a digital modulation method that uses one frequency for describing a '0' (zero) logic level and another frequency for describing a '1' logic level.

Near Field Communication or NFC 104, is a short-range high frequency wireless communication technology which enables the exchange of data between devices over about a 10 centimeter distance. The technology is a simple extension of the ISO/IEC 14443 proximity-card standard (contactless card, RFID) that combines the interface of a smart-card 100 and the reader 704 into a single device. An NFC device 704 can communicate 2014 with both existing ISO/IEC 14443 smartcards 100 and reader devices 704, as well as with other NFC devices 704, and is thereby compatible with existing contactless infrastructures, which are already in use for public transportation and remote payment 2030. The NFC 104 is primarily aimed at usage in mobile phones 710 remote communication 2017, but can also be used in conjunction with the transaction card 100 of the invention. In order to send an RF operation 2028 from the transaction card 100 through the mobile phone 710 directly to the ATM machine 704 as well as to the credit machine 704 at the firm, or at a clearing service receiver unit 704, without even removing the transaction card 100 out of the wallet. The remote communication 2017, 2014, 2020 orders 2028 the transaction details including the card owner's ID, the card ID and the transaction charging amount 2006. The NFC 104 also enables to use the mobile phone 710 keypad to insert a PIN code which in turn activates the credit card 100 for operation. An additional application for the NFC 104 is to verify the identity of the clearing machine.

Essential specifications of NFC include:

Like ISO/IEC 14443, NFC 104 communicates via magnetic field induction, where two loop antennas 1602 are located within each other's near field, effectively forming an air-core transformer. It operates within the globally available and unlicensed radio frequency ISM band of 13.56 MHz, with a bandwidth of almost 2 MHz.

Working distance with compact standard antennas: up to 20 cm

Supported data rates: 106, 212, 424 or 848 kbit/s

There are two modes of communication:

Passive Communication Mode: The Initiator device provides a carrier field and the target device answers by modulating existing field. In this mode, the Target device may draw its operating power 705 from the Initiator-provided electromagnetic field, thus making the Target device a transponder.

Active Communication Mode: Both Initiator and Target device communicate by alternately generating their own field. A device deactivates its RF field while it is waiting for data 1601. In this mode, both devices typically need to have a power supply 705. Communication Schemes are shown in Table 1:

TABLE 1

Common Communications Schemes

| Baud | Active device | passive device |
| --- | --- | --- |
| 424 kBd | Manchester, 10% ASK | Manchester, 10% ASK |
| 212 kBd | Manchester, 10% ASK | Manchester, 10% ASK |
| 106 kBd | Modified Miller, 100% ASK | Manchester, 10% ASK |

NFC 104 employs two different codings to transfer data 1601. If an active device transfers data at 106 kbit/s, a modified Miller coding with 100% modulation is used. In all other cases Manchester coding is used with a modulation ratio of 10%.

NFC devices 704 are able to receive 2029 and transmit 2028 data 1601 at the same time. Thus, they can check the radio frequency field and detect a collision if the received 2029 signal does not match with the transmitted signal.

There are currently three main use cases for NFC 104:

card emulation: the NFC device 704 behaves like an existing contactless card 100 reader mode: the NFC device 704 is active and reads a passive RFID 707 tag, e.g.: identifying the reader's 704 magnetic head 1701 and remote charging of cash money balance by the remote 2017 payment 2030 mode 2030 through the cellular phone 710 to the CPU unit 103 and finally clearing the money 2005, by the cash mode of the 7816 connector 201.

Peer-to-Peer (P2P) mode: two NFC devices 704 are communicating together with the smart card 100 and exchanging information through the NFC unit 104 by the RFID device 707 in the card 100.

V. THE FUNCTIONAL OPERATION

The smart card 100 operation depends on the payment devices 704 as well as on the NFC 104 remote devices 704, 710 in its vicinity, since those devices 704, 710 trigger the smart card operation.

Figure 20:
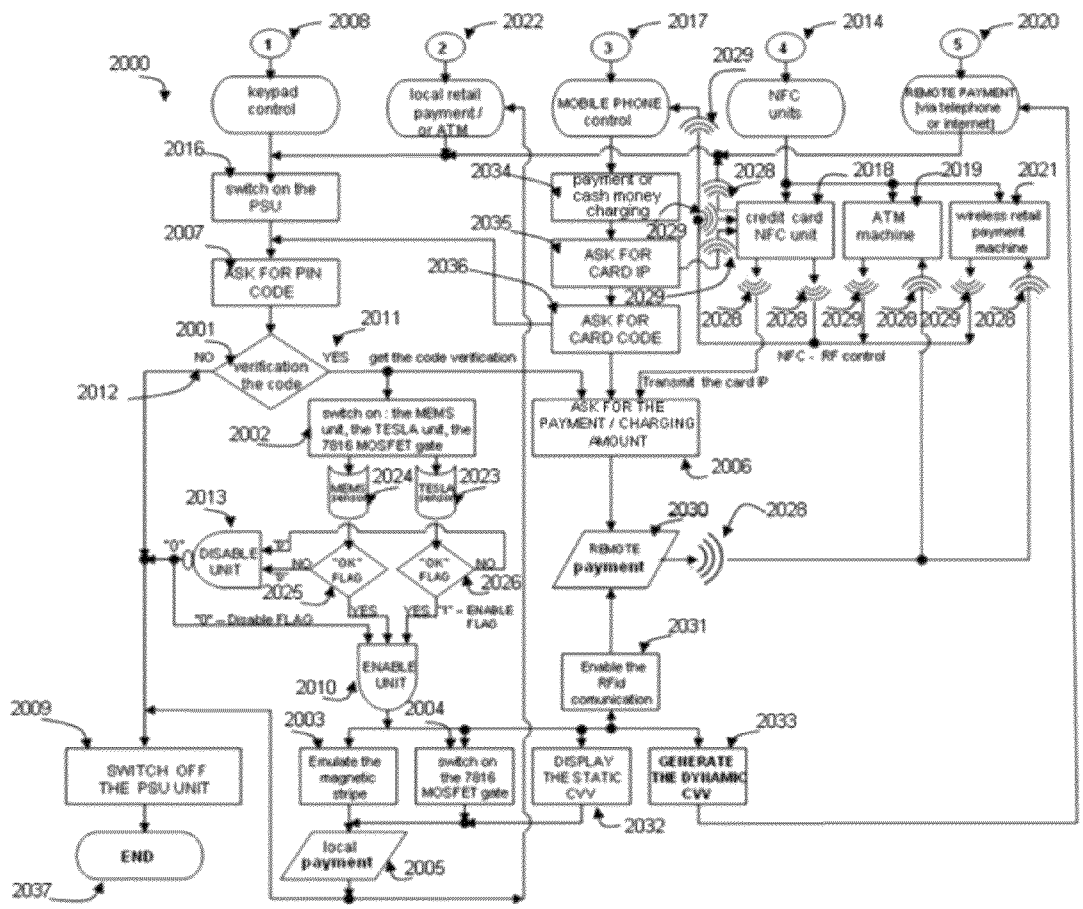
FIG. 20 is a logical flowchart of the authentication process according to the invention. The chart features up to five input channels

FIG. 20 illustrates the logical operation of the smart card 100 of the invention by a sequence of flowchart 2000.

In order to save its limited energy, the smart card 100 is programmed by default to be in a normally "sleep mode", waiting for initial order 2008, 2022, 2017, 2014 or 2020.

After receiving an initial order 2008 the PSU will "SWITCH ON" 2016 as well as the keypad 108, waiting for the PIN code 2007. While the typed code 2001 has been verified 2011 by the CPU 103 the sensor including the 7816 terminal will "SWITCH ON" 2002 ready for the magnetic reader 1701 operation as well as to identify its parameters via the MEMS sensor 2024 and the TESLA 2023 sensor.

In case there is one legal reader 401 then the enable unit 2010 module will emulate 2003 the magnetic stripe as well as open the 7816 terminal 2004, displaying the CVV 2032 (one option) or generate it 2033 (another option). Then the local payment 2005 is performed by the card 100 owner in a physical operation 2022 in the payment machine 704 or in the ATM 704. In this scenario the card 100 owner is able to choose a remote 2028 payment 2030 by the RF 707 mode 2031 through the NFC 104 unit from the card 100, for use in "out of the wallet" payment 2030.

If the sensors 110, 111 detect 2025, 2026 a fraudulent reading attempt during the data reading from the magnetic stripe 112, by a second magnetic reader 402, then the MEMS flag 2025 and the TESLA flag 2026 will "TURN DOWN" resulting in a disable unit 2013 instruction, switching off immediately the PSU 2009. The card 100 is switched off before the magnetic stripe 112 is completely read by the fraudulent magnetic reader 402. Operation then proceeds to the END block 2037 of the process—back to normally closed mode.

The same process is followed if the PIN code is not authenticated 2012.

A second group of initial operations (starting by 3,4 in FIG. 20) start from NFC 704 mode 2014 or from a cellular phone 710 mode 2017, where the devices 704, 710 transmit 2029 an initial command and the card 100 will "SWITCH ON" 2016 waiting for the PIN CODE 2007. Then the process that was described above will start again. After the PIN CODE verification 2011 is completed, the card 100 is asked by the cellular 2034 for the payment mode 2034 (same process applies for charging cash money balance to the card 100), using the 7816 201 clearing operation mode, all actions derived through the cellular phone 710 without taking the card 100 "out of the wallet". In a next step, the cellular phone 710 asks for the card 100 IP 2035, getting it automatically by the card 100 NFC 104 unit, then the user will be asked to enter the PIN code 2036. Waiting for the same verification 2001 process, while getting the permission 2011, the user will be asked for the payment amount 2006 (same process applies for the money charging amount 2006). Then we will go again for the remote order 2029 operation: payment 2030/or card 100 cash charging 2030, from this chart point the remote order 2029 will be transmitted by the RF unit 707 to the ATM's 704 NFC units 2019 or to the credit card 100 payment's 704 NFC units 2021, or to the credit card's 100 NFC unit b if cash charging 2034 is required.

The final mode of remote payment is use for a telephone 710 or Internet operation 2020, then the same verification 2001 process will start again, asking for the PIN code, then according to the verification 2011, the CPU 103 will send a command to the display 109 to show the static CVV 2032 (one option) or regenerate a CVV code (another option) 2033 by the CVV generator 714.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A transaction card, comprising:
   (i) an authentication unit for authenticating the transaction card holder;
   (ii) a magnetic stripe wherein parts of the magnetic field pattern of said magnetic stripe are generated by currents running through pickup coils only after said authentication unit authenticates the transaction card holder; and
   (iii) one or more sensors located along the magnetic stripe in order to detect if the transaction card is being read by two reading magnetic heads at the same time,
   wherein the transaction card is blocked by stopping the currents from running through said pickup coils when a second reading magnetic head is detected.

2. The transaction card according to claim 1, wherein said one or more sensors are one or more Micro Electro Mechanical System (MEMS) pressure nanosensors that detect the pressure pulse induced by a reading magnetic head, wherein if the pressure nanosensors detect two pressure pulses corresponding to two reading magnetic heads while the magnetic stripe is being read then the one of the reading magnetic heads is assumed to be a fraudulent reading magnetic.

3. The transaction card according to claim 1, wherein said one or more sensors are magnetic sensors.

4. The transaction card according to claim 3, wherein said one or more magnetic sensors are TESLA magnetic sensors.

5. The transaction card according to claim 3, wherein said one or more magnetic sensors are the transaction card's pickup coils used for partial emulation, wherein said pickup coils detect changes in the magnetic flux.

6. The transaction card according to claim 1, wherein said authentication unit authenticates the transaction card holder after entering a PIN via a keyboard, entering a PIN via a keypad, voice recognition identification of one or more voices, biometric identification, identification via a connection to a remote device or any combination thereof.

7. The transaction card according to claim 6, wherein the keys of said keyboard or keypad are implemented by LCD touch screen elements and the keyboard's or keypad's layout is changed after each key entry.

8. The transaction card according to claim 1, wherein the transaction card's communication channel as defined by International Organization for Standardization (ISO) 7816 is disabled until said authentication unit authenticates the transaction card holder.

9. The transaction card according to claim 8, wherein disabling the 7816 communication channel is achieved by using the Mosfet gate to enable and disable the power pin of the 7816 connector.

10. The transaction card according to claim 9, wherein disabling and/or enabling the magnetic stripe's continuity, and/or the 7816 MOSFET gate, is achieved by using a blocking unit, based on Micro Electro Mechanical System (MEMS) pressure sensor, or TESLA sensors, in order to detect illegal magnetic reader.

11. The transaction card according to claim 8, further comprising a PSU (power supply unit), RF charging, and direct connection to the 7816 power terminal, moreover using the Piezoresistive Pressure line—MEMS's current for charging the transaction card's battery.

12. The transaction card according to claim 1, wherein at least one coil is placed at the beginning of the magnetic stripe.

13. The transaction card according to claim 1, wherein at least one coil is placed at track 2 in the pin code position.

14. The transaction card according to claim 1, wherein after said authentication unit authenticates the transaction card holder, the transaction card is made available for a predetermined amount of transactions, for a predetermined amount of time or both.

15. The transaction card according to claim 1, further comprising near field communication capabilities, such as RFID.

16. The transaction card according to claim 1, wherein said authentication unit authenticates the transaction via the transaction card holder's mobile phone.

17. The transaction card according to claim 16, wherein the authentication via said mobile phone involves transmitting the transaction card holder's ID, the transaction card's ID and optionally the face amount's required.

18. The transaction card according to claim 16, wherein the authentication via said mobile phone use for remote charging of cash money balance by the remote payment mode, via the mobile phone to the CPU unit, and clearing the money by the cash mode of the transaction card's 7816 connector.

19. The transaction card according to claim 1, wherein said authentication unit authenticates the transaction card via a connection to a remote device.

20. The transaction card according to claim 1, wherein said transaction card is a credit card.

21. A transaction card, comprising:
a magnetic stripe having a magnetic field pattern, fewer than all parts of the magnetic field pattern being generated by currents running through pickup coils after a transaction card holder is authenticated; and
one or more sensors located along the magnetic stripe to sense when the transaction card is being read concurrently by more than one reading magnetic head, wherein the transaction card is blocked by stopping the currents from running through the pickup coils, when the one or more sensors sense that the transaction card is being read by more than one magnetic head at the same time.

* * * * *